(12) United States Patent
Yan et al.

(10) Patent No.: US 7,656,619 B1
(45) Date of Patent: Feb. 2, 2010

(54) MAGNETIC HEAD SLIDERS FOR DISK DRIVES HAVING A HEATING ELEMENT AND PEDESTAL IN THICK UNDERCOAT LAYER

(75) Inventors: Wentao Yan, Fremont, CA (US); Michael Mallary, Sterling, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 402 days.

(21) Appl. No.: 11/418,512

(22) Filed: May 4, 2006

Related U.S. Application Data

(63) Continuation-in-part of application No. 11/399,196, filed on Apr. 6, 2006, which is a continuation-in-part of application No. 10/859,917, filed on Jun. 3, 2004, now abandoned.

(60) Provisional application No. 60/678,405, filed on May 6, 2005, provisional application No. 60/669,990, filed on Apr. 11, 2005, provisional application No. 60/476,129, filed on Jun. 5, 2003.

(51) Int. Cl.
*G11B 5/56* (2006.01)
*G11B 21/24* (2006.01)

(52) U.S. Cl. .............................. 360/294.7; 360/125.31; 360/125.74

(58) Field of Classification Search ............... 360/234.8, 360/125.3, 125.31, 125.32, 125.74, 125.75, 360/126, 128, 234.5, 234.3, 236.5, 323, 294.7
See application file for complete search history.

(56) References Cited

U.S. PATENT DOCUMENTS

| | | | |
|---|---|---|---|
| 5,991,113 A | 11/1999 | Meyer et al. | |
| 6,195,219 B1 | 2/2001 | Smith | |
| 6,344,949 B1 | 2/2002 | Albrecht et al. | |
| 6,597,539 B1 | 7/2003 | Stupp et al. | |
| 6,760,191 B1 | 7/2004 | Yan et al. | |
| 6,842,313 B1 | 1/2005 | Mallary | |
| 6,949,004 B1 | 9/2005 | Broussalian et al. | |

(Continued)

FOREIGN PATENT DOCUMENTS

JP 2006031817 A * 2/2006

OTHER PUBLICATIONS

C.E. Yeack-Scranton et al., "An Active Slider for Practical Contact Recording", IEEE Transactions on Magnetics, vol. 26, No. 5, Sep. 1990, pp. 2478-2483.

*Primary Examiner*—A. J. Heinz
(74) *Attorney, Agent, or Firm*—Westman, Champlin & Kelly, P.A.

(57) ABSTRACT

A head includes a substrate, an undercoat material, a read structure, and a write structure. The undercoat material at least partially provides electrical insulation between the read structure and the substrate. The read structure allows for reading magnetic fields from a recording medium. The write structure allows for providing particular magnetic fields to the recording medium to write data to the recording medium. The read structure is located at least partially between a portion of the undercoat material and a portion of the write structure. The head further includes at least one of (i) a heating element located at least partially in the undercoat material for providing heat and (ii) a pedestal for at least partially providing thermal conduction between the read structure and the substrate. Also, a thickness of the undercoat material may be set for improving flying height adjustment efficiency.

32 Claims, 13 Drawing Sheets

U.S. PATENT DOCUMENTS

| | | |
|---|---|---|
| 6,972,919 B2 | 12/2005 | Suk |
| 6,995,950 B2 | 2/2006 | Lairson et al. |
| 6,999,265 B1 | 2/2006 | Schreck et al. |
| 7,092,193 B1* | 8/2006 | McKenzie et al. ............ 360/75 |
| 2002/0114108 A1 | 8/2002 | Bement et al. |
| 2003/0174430 A1 | 9/2003 | Takahashi et al. |
| 2004/0240109 A1* | 12/2004 | Hamann et al. ............ 360/126 |
| 2005/0024775 A1* | 2/2005 | Kurita et al. ............. 360/234.3 |
| 2005/0094316 A1* | 5/2005 | Shiramatsu et al. ...... 360/234.5 |
| 2005/0254171 A1* | 11/2005 | Ota et al. .................... 360/128 |
| 2006/0007594 A1* | 1/2006 | Umehara et al. ............ 360/126 |
| 2006/0023367 A1* | 2/2006 | Suk ............................ 360/323 |
| 2006/0034013 A1* | 2/2006 | Kato et al. .................. 360/128 |
| 2008/0266716 A1* | 10/2008 | Kato ........................ 360/236.5 |

* cited by examiner

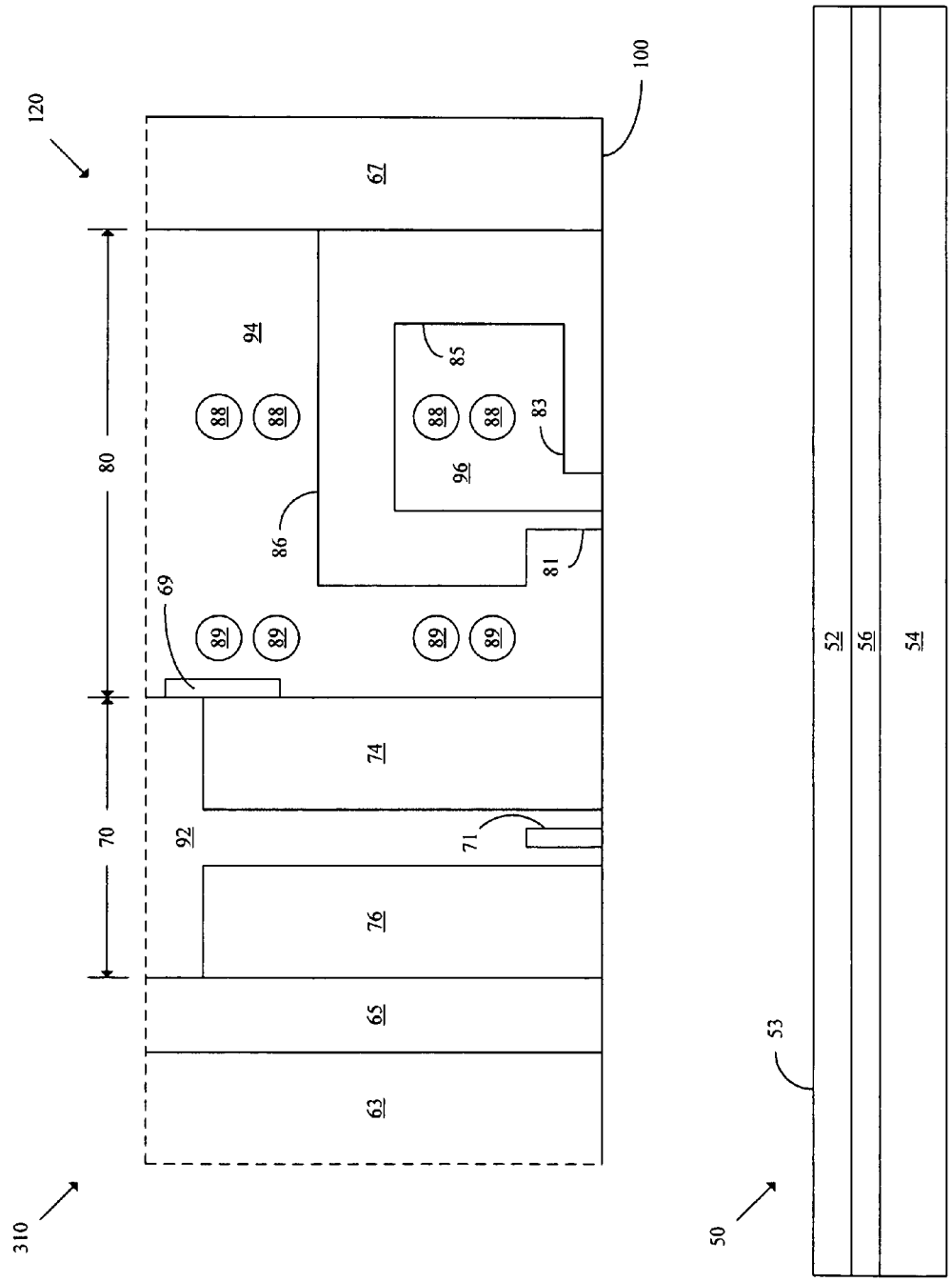

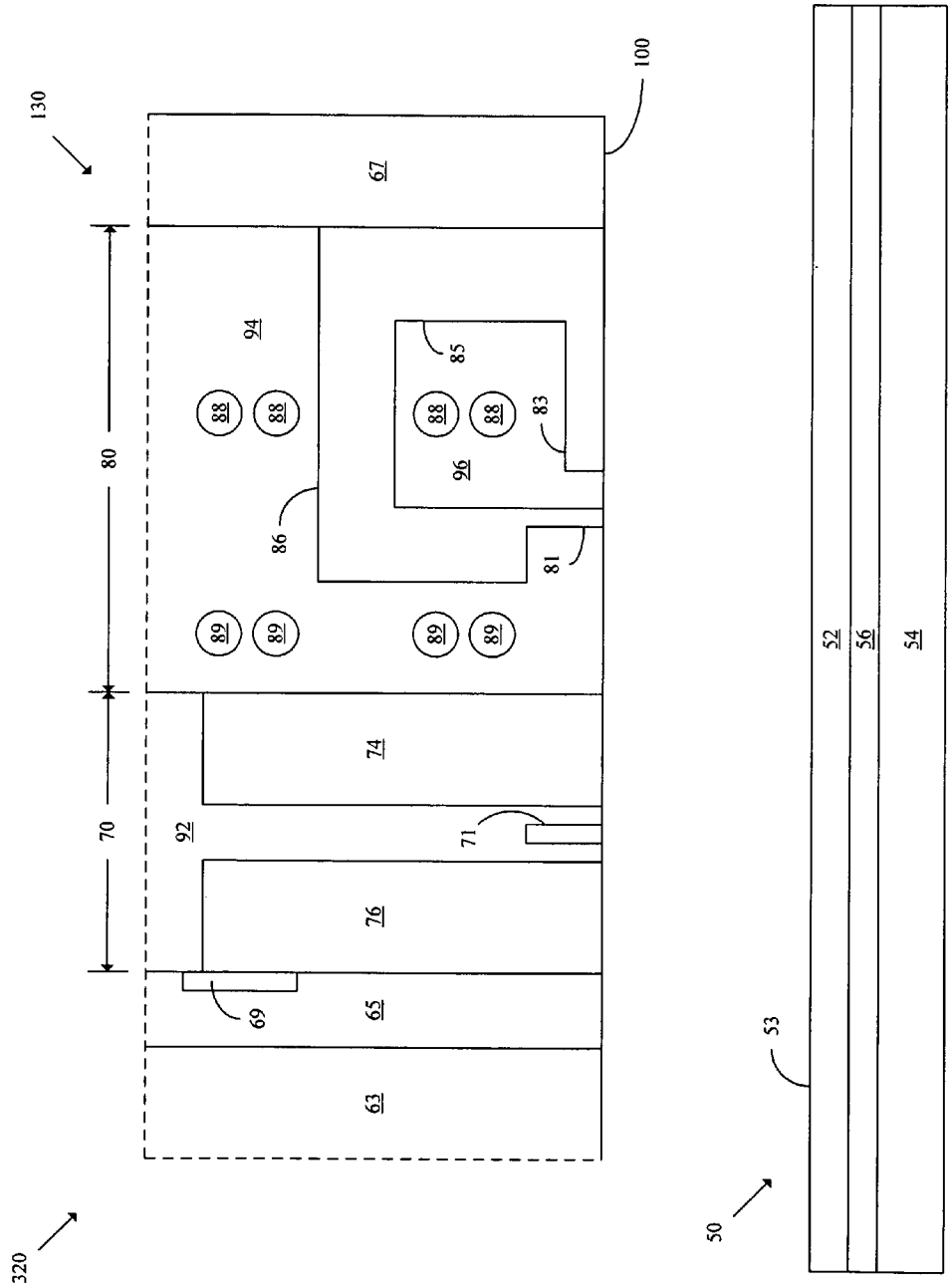

MAGNETIC HEAD SLIDERS FOR DISK DRIVES HAVING A HEATING ELEMENT AND PEDESTAL IN THICK UNDERCOAT LAYER

CROSS-REFERENCE TO RELATED PATENT APPLICATIONS

Embodiments of the present invention relate to U.S. Provisional Application Ser. No. 60/678,405, filed May 6, 2005, entitled "Designs for Reducing Gap-to-Minimum Fly Height using Heater in Thick Undercoat", the contents of which are incorporated by reference herein and which is a basis for a claim of priority.

This application is a continuation-in-part of U.S. patent application Ser. No. 11/399,196, filed Apr. 6, 2006, entitled "Magnetic Heads Disk Drives and Methods with Thicker Read Shield Structures for Reduced Stray Field Sensitivity", which claims priority to U.S. Provisional Application Ser. No. 60/669,990, filed Apr. 11, 2005, entitled "S0 Structure for Reduced Stray Field Sensitivity", the contents of both of which are incorporated by reference herein.

This application is a continuation-in-part of U.S. patent application Ser. No. 10/859,917, filed Jun. 3, 2004 (now abandoned) entitled "Thermal Actuator Design for Hard Disk Drive Magnetic Recording", which claims priority to U.S. Provisional Application Ser. No. 60/476,129, filed Jun. 5, 2003, entitled "Thermal Actuator Design for Hard Disk Drive Magnetic Recording", the contents of both of which are incorporated by reference herein.

BACKGROUND OF THE INVENTION

1. Field of the Invention

Embodiments of the present invention relate generally to magnetic heads, sliders, disk drives, and methods and, in specific embodiments, to a head comprising a substrate, a read structure for reading magnetic fields from a recording medium, an undercoat material for at least partially providing electrical insulation between the read structure and the substrate, and at least one of (i) a heating element located at least partially in the undercoat material for providing heat and (ii) a pedestal for at least partially providing thermal conduction between the read structure and the substrate.

2. Related Art

A major goal among many disk drive manufacturers is to continue to increase an amount of data that can be stored on a recording medium while still maintaining data integrity and disk drive reliability. Two ways that have been proposed for increasing a recording density in disk drives are: (i) lowering a flying height of a slider over a recording medium; and (ii) storing magnetization vertically within a recording medium, as in perpendicular recording, rather than storing magnetization longitudinally in the recording medium, as in longitudinal recording.

However, there have been problems with lowering a flying height of a slider in that damage may be caused due to contact between the slider and the recording medium. Also, there have been problems with perpendicular recording in that perpendicular disk drives are more sensitive to external stray magnetic fields than are longitudinal disk drives, and such external stray magnetic fields may lead to a loss of performance and even to irreversible disk drive failure in perpendicular disk drives.

A disk drive typically includes a slider and a recording medium. The slider typically includes a body section, a read structure, and a write structure. The read structure typically comprises a read element and two read shields, where the read element is located between the two read shields. The read element generally allows for reading data from the recording medium, and the two read shields generally allow for at least partially shielding the read element from stray magnetic fields. The write structure typically comprises a write pole, a write yoke, and a write return shield, where the write structure allows for writing data to the recording medium. The read structure and the write structure are generally located near a trailing edge of the slider. The slider is typically configured to fly on an air bearing that is generated by rotation of the recording medium.

Examples of disk drives are provided in the following references: (i) U.S. Pat. No. 6,760,191 entitled "Internal Heat Dissipater used to Reduce Slider and Write Pole Thermal Protrusion for Thin Film Recording Heads", the contents of which are incorporated by reference herein; (ii) U.S. Pat. No. 6,842,313 entitled "Floating Down Stream Perpendicular Write Head Shield", the contents of which are incorporated by reference herein; and (iii) U.S. Pat. No. 6,597,539 entitled "Suspension Assembly for Supporting a Read/Write Head over a Rotating Storage Disk with Dynamically Adjustable Fly Height", the contents of which are incorporated by reference herein.

Increasing a magnetic storage density of a recording medium requires increasing a number of data bits per square inch on the recording medium. Placing a read structure and a write structure of a slider closer to a recording medium allows for increasing the magnetic storage density of the recording medium. This is because a magnetic field detected by a read element from a portion of the recording medium under the read element increases exponentially as the read element is moved closer to the recording medium. Moving the read element closer to the recording medium allows for compensating for lower flux levels provided from smaller areas on the recording medium where a given bit of data is recorded. Also, a strength of magnetic flux from the write structure to the recording medium and an accuracy of directing magnetic flux to a specific portion of the recording medium may be improved the closer the write structure is to the recording medium.

However, placing a slider closer to a recording medium may increase a probability that the slider will contact the recording medium when flying over the recording medium. Such contact between the slider and the recording medium may damage the slider and the recording medium. As a consequence, disk drive reliability may be adversely affected by contact between the slider and the recording medium due to low flying heights of the slider over the recording medium.

One proposal for increasing a magnetic storage density in a disk drive while limiting adverse consequences relating to disk drive reliability is to only position a slider close to a recording medium during read or write operations, and then to increase a distance between the slider and the recording medium during idle times when no read or write operations are being performed by the disk drive. This would allow for obtaining the benefits of lower flying heights during read and write operations to increase a recording density, while obtaining the benefits of higher flying heights during idle times to attempt to limit adverse consequences on disk drive reliability. However, there exists a need for flying height adjustment schemes that provide for greater efficiency and increased controllability.

With respect to perpendicular disk drives, experiments have demonstrated that perpendicular disk drives are sensitive to external stray magnetic fields that are generated by sources external to the disk drives. External stray magnetic fields may be generated by many external sources including, but not limited to, motors, magnets, electric currents, and the like. For example, external stray magnetic fields entering a particular disk drive may be caused by drive motors of adjacent disk drives that are in a same enclosure with the particular disk drive. Also, with disk drives placed in televisions, automobiles, computers, and the like, there are many potential sources of external stray magnetic fields, such as power supplies, motors, electric circuits, and the like.

In various experiments, a loss of performance has been observed in perpendicular disk drives when they are operated in the presence of external stray magnetic fields. Such a loss of performance was noticed even for relatively small external stray magnetic fields. For example, in various experiments, one order of bit error rate (BER) loss was observed in perpendicular disk drives when the disk drives were in the presence of external stray magnetic fields with strengths even as small as 10 Oersted (Oe). A possible explanation of the BER loss is an increase in asymmetry of a read element due to a resulting stray magnetic field in a vicinity of the read element.

Also, in various experiments, an irreversible disk drive failure has been observed if a perpendicular disk drive is operated in the presence of a large enough external stray magnetic field. For example, irreversible disk drive failures have been observed in perpendicular disk drives that are operated in the presence of external stray magnetic fields with strengths even as small as approximately 50 Oe. The irreversible failures of the disk drives have been associated with an erasure of servo data on recording media in the disk drives. Servo data on a recording medium permits the determination of the position of a head with respect to the recording medium, and if the servo data is erased, the head is not able to be positioned properly for read and write operations, which leads to an irreversible drive failure.

Based on the experiments that show a loss of performance and even a possible irreversible disk drive failure for relatively small external stray magnetic fields, it is important to try to determine a possible explanation for the increase in asymmetry of a read element and an erasure of data on a recording medium due to such relatively small external stray magnetic fields. It has been noted in U.S. Pat. No. 6,995,950 entitled "Transverse Biased Shields for Perpendicular Recording to Reduce Stray Field Sensitivity", the contents of which are incorporated by reference herein, that read shields capture stray magnetic fields. In an analysis that has been performed, the read shields have been found to provide a large magnetic field when in the presence of an external stray magnetic field, which can explain the increase in asymmetry of a read element and the erasure of a recording medium.

Traditional read shields are manufactured with thicknesses that are designed to provide good domain structures such that the creation of bad magnetic domains in the read shields can be hopefully avoided. However, it has been determined that the geometries of traditional read shields cause the read shields to capture, focus, and greatly magnify external stray magnetic fields, which can lead to strong magnetic fields near a read element and a recording medium in a disk drive to possibly result in a loss of performance in the disk drive and an irreversible drive failure in the disk drive.

In light of the above-mentioned problems, there is a need for sliders that allow for improved flying height adjustment. There is also a need for sliders in disk drives that provide for reducing a magnification of external stray magnetic fields by read shields than with traditional sliders. Also, there is a need for sliders with features that allow for improved flying height adjustment while also providing for less magnification of external stray magnetic fields by read shields.

SUMMARY OF THE DISCLOSURE

Some embodiments of the present invention relate to sliders with heads that include heating elements for performing flying height adjustment (FHA). By providing heat from a heating element located in a head, layers in the head may expand due to the heat, and the expansion of the layers may cause an air bearing surface of the slider to expand so as to be closer to a surface of a recording medium. In various embodiments, the heating element is located at least partially in an undercoat material of the head.

Placing a heating element at least partially in an undercoat material of a head of a slider allows for providing a small difference between a read gap flying height (read gap FH) and a minimum flying height (min FH) of the slider, and for providing a small difference between a write gap flying height (write gap FH) and the min FH of the slider when performing FHA. When the slider is flying on an air bearing generated by a corresponding recording medium, the min FH is a minimum distance between an air bearing surface of the slider and a surface of the recording medium, the read gap FH is a distance between a read structure of the slider and the surface of the recording medium, and the write gap FH is a distance between a write structure of the slider and the surface of the recording medium.

By providing a smaller difference between a read gap FH and a min FH, known as a read gap-to-min FH difference, the read structure is positioned closer to the recording medium than in the case of a same min FH but a greater read gap-to-min FH difference. Similarly, by providing a smaller difference between a write gap FH and a min FH, known as a write gap-to-min FH difference, the write structure is positioned closer to the recording medium than in the case of a same min FH but a greater write gap-to-min FH difference. Placing a read structure and a write structure of a slider closer to a recording medium allows for increasing a magnetic storage density of the recording medium.

In various embodiments, a heating element is located at least partially in an undercoat material of a head of slider, and the undercoat material is formed of a thermally insulative material and has a large thickness. By increasing a thickness of the undercoat material of the head, an efficiency of FHA may be improved, because there would be an increase in a volume of material for protrusion. Also, by increasing a thickness of the undercoat material of the head, an efficiency of FHA with the heating element may be improved, because less heat would be transferred from the heating element to a substrate of the head due to the improved thermal insulation between the heating element and the substrate provided by the thicker undercoat material.

FHA efficiency may be defined in terms of a displacement of a portion of an air bearing surface of a slider with respect to an input power of a heating element. By providing increased thermal insulation between the heating element and the substrate, more heat from the heating element may be transferred to other layers of the head. As a consequence, there may be a greater displacement of a portion of the slider at an air bearing surface of the slider near a read structure and a write structure of the slider for a given input power of the heating element, which corresponds to an improved FHA efficiency.

In various embodiments, a thermally conductive pedestal is placed in a thick undercoat material of a head of a slider for at least partially providing thermal conduction. By increasing thermal conduction between a read structure and a substrate of the head, more heat is able to be transferred from the read structure to the substrate, so as to reduce a temperature of a read element of the read structure. By reducing an operating temperature of the read element of the read structure, an expected operating lifetime of the read element may be increased.

Also, by increasing thermal conduction between a write structure and the substrate of the head and between a read structure and the substrate of the head, more heat is able to be transferred from the write structure and the read structure to the substrate. When a write operation is performed by the write structure, current is passed through coils to perform the write operation, which generates heat, and may lead to write pole tip protrusion (WPTP) where the write structure and read structure expand at an air bearing surface of the slider. By reducing an operating temperature of the write structure and read structure during write operations, there may be a reduction in WPTP. Such reduction in WPTP during write operations may improve a controllability of FHA when using a heating element in the head.

In various embodiments, a thermally conductive pedestal is placed in a thick undercoat material of a head of a slider, and the pedestal comprises a magnetic material with an orientation selected to capture stray magnetic fields. By forming the pedestal with a magnetic material having an orientation selected to capture stray magnetic fields, the pedestal is able to capture some external stray magnetic fields that are provided from external sources. Also, such a pedestal is able to spread out the captured external stray magnetic fields so as to reduce a capturing, focusing, and magnifying of external stray magnetic fields by a bottom read shield and a top read shield of a read structure of the head. Reducing the strengths of magnetic fields generated in the bottom read shield and the top read shield due to external stray magnetic fields helps to reduce unwanted erasure of a recording medium and helps to reduce a creation of an asymmetry in a read element of the read structure.

In various embodiments, an exchange decoupling layer is located at least partially between a pedestal in an undercoat material of a head and a bottom read shield of a read structure of the head. The exchange decoupling layer provides exchange decoupling of the pedestal and the bottom read shield so as to reduce or minimize an effect of domains in the pedestal on domains in the bottom read shield. As a consequence, the exchange decoupling layer allows for keeping a good domain structure in the bottom read shield so as to limit an amount of domain noise generated by the bottom read shield near a read element of the read structure.

Therefore, various embodiments of the present invention provide for improved flying height adjustment of a read structure and a write structure of a head and for reduced external stray magnetic field sensitivity of the head. As a result, embodiments of the present invention empower the use of flying height adjustment techniques and perpendicular magnetic recording methods to increase recording densities in disk drives while limiting adverse consequences relating to disk drive reliability.

A head in accordance with an embodiment of the present invention comprises a substrate, a read structure, and an undercoat material. The read structure allows for reading magnetic fields from a recording medium. The undercoat material allows for at least partially providing electrical insulation between the read structure and the substrate. The head further comprises at least one of (i) a heating element located at least partially in the undercoat material for providing heat and (ii) a pedestal for at least partially providing thermal conduction between the read structure and the substrate.

In various embodiments, the head further comprises a write structure. The write structure allows for providing particular magnetic fields to the recording medium to write data to the recording medium. Also, in various embodiments, the read structure is located at least partially between a portion of the undercoat material and a portion of the write structure. In some embodiments, the head further comprises an overcoat layer for at least partially protecting the write structure. Also, in some embodiments, the write structure is located at least partially between a portion of the read structure and a portion of the overcoat layer.

In various embodiments, a thickness of the undercoat material in a direction from the substrate to the read structure is greater than 10 µm. In some embodiments, a thickness of the undercoat material in a direction from the substrate to the read structure is greater than 20 µm. Also, in some embodiments, a thickness of the undercoat material is greater than a thickness of the read structure. In various embodiments, the substrate comprises AlTiC, or the like. Also, in various embodiments, the undercoat material comprises $Al_2O_3$, or the like. In various embodiments, at least a portion of the undercoat material is located between a portion of the substrate and a portion of the read structure.

In some embodiments, the head comprises the heating element. In further embodiments, the heating element is located at least partially between the substrate and the read structure. In various embodiments, the heating element comprises a heating coil, or the like. Also, in various embodiments, the heating element comprises a film heater, or the like. In some embodiments, the heating element is controllable for selectively heating at least a particular portion of the read structure, and the read structure is formed such that the read structure is capable of expanding at an air bearing surface of the head when at least the particular portion of the read structure is heated by the heating element.

In various embodiments, the head further comprises a write structure for providing particular magnetic fields to the recording medium to write data to the recording medium, where the read structure is located at least partially between the undercoat material and the write structure, and the heating element allows for heating at least a portion of the write structure. In further embodiments, the heating element is controllable for selectively heating at least the portion of the write structure, and the write structure is formed such that the write structure is capable of expanding at an air bearing surface of the head when at least the portion of the write structure is heated by the heating element.

In some embodiments, the head further comprises a second heating element for providing heat. In various embodiments, the second heating element is located at least partially in the undercoat material. Also, in various embodiments, the head further comprises a write structure for providing particular magnetic fields to the recording medium to write data to the recording medium and an overcoat layer for at least partially protecting the write structure, where the read structure is located at least partially between a portion of the undercoat material and a portion of the write structure, the write structure is located at least partially between a portion of the read structure and a portion of the overcoat layer, and the second heating element is located at least partially in the overcoat layer.

In some embodiments, the head comprises the pedestal. In further embodiments, the pedestal is located at least partially between the read structure and the substrate. Also, in some embodiments, the pedestal is located at least partially in the undercoat material. In various embodiments, the pedestal comprises a nickel iron alloy, or the like. In some embodiments, the pedestal comprises invar, or the like. Also, in some embodiments, the pedestal comprises a NiFe invar like alloy where a Ni composition of the alloy is between 30 and 45 atomic percent.

In various embodiments, the read structure comprises a read element, a top read shield, and a bottom read shield. The read element allows for reading the magnetic fields from the recording medium. The top read shield allows for at least partially shielding the read element from stray magnetic fields. The bottom read shield allows for at least partially shielding the read element from the stray magnetic fields. In further embodiments, the read element is located at least partially between the top read shield and the bottom read shield, and the bottom read shield is located at least partially between the undercoat material and the top read shield.

In various embodiments, a first portion of the pedestal is in contact with the substrate, and a second portion of the pedestal is in contact with the bottom read shield. In some embodiments, the pedestal comprises a magnetic material having an orientation selected to capture at least a portion of the stray magnetic fields. In further embodiments, the head further comprises an exchange decoupling layer located at least partially between the pedestal and the bottom read shield for providing exchange decoupling of the pedestal and the bottom read shield. In various embodiments, the exchange decoupling layer comprises at least one of copper, chromium, gold, silver, platinum, iridium, tantalum, titanium, tungsten, or the like.

In some embodiments, the bottom read shield comprises a first magnetic material, the pedestal comprises a second magnetic material that is a different type of material than the first magnetic material, and the second magnetic material has a lower coefficient of thermal expansion than the first magnetic material. In various embodiments, the head further comprises a second pedestal located at least partially in the undercoat material for at least partially providing thermal conduction between the read structure and the substrate. Also, in various embodiments, the head comprises the heating element and the pedestal. In some embodiments, the pedestal is located at least partially between the heating element and an air bearing surface of the head.

A disk drive in accordance with an embodiment of the present invention comprises a slider, a recording medium, and an actuator arm assembly. The recording medium allows for storing data. The actuator arm assembly allows for positioning the slider with respect to the recording medium. The slider comprises a slider body, a read structure, and an undercoat material. At least a portion of the slider body is in contact with the actuator arm assembly. The read structure allows for reading magnetic fields from the recording medium. The undercoat material allows for at least partially providing electrical insulation between the read structure and the slider body. The slider further comprises at least one of (i) a heating element located at least partially in the undercoat material for providing heat and (ii) a pedestal for at least partially providing thermal conduction between the read structure and the slider body.

In various embodiments, the slider further comprises a write structure and an overcoat layer. The write structure allows for providing particular magnetic fields to the recording medium to write data to the recording medium. The overcoat layer allows for at least partially protecting the write structure. In some embodiments, the read structure is located at least partially between a portion of the undercoat material and a portion of the write structure. Also, in some embodiments, the write structure is located at least partially between a portion of the read structure and a portion of the overcoat layer.

In various embodiments, the slider comprises the heating element. Also, in various embodiments, the heating element is controllable for selectively providing heat, and the slider is configured such that the read structure is displaced by a distance at an air bearing surface of the slider when the heating element provides a particular amount of heat. In some embodiments, the slider comprises the pedestal. Also, in some embodiments, the slider comprises the heating element and the pedestal. In various embodiments, the slider body comprises a composition of alumina and titanium-carbide, or the like.

A method of manufacturing a head in accordance with an embodiment of the present invention comprises: (a) providing a substrate; (b) depositing an undercoat material on at least a portion of the substrate; (c) at least one of (i) depositing a heating element at least partially in the undercoat material and (ii) depositing a thermally conductive pedestal on at least a second portion of the substrate; and (d) depositing a read structure. The undercoat material is capable of at least partially providing electrical insulation between the read structure and the substrate. The read structure is capable of reading magnetic fields from a recording medium.

In various embodiments, the method further comprises: (e) depositing a write structure on at least a portion of the read structure; and (f) depositing an overcoat layer on at least a portion of the write structure. The write structure is capable of providing particular magnetic fields to the recording medium to write data to the recording medium. In some embodiments, the method comprises depositing the heating element at least partially in the undercoat material, where the heating element is capable of providing heat. In further embodiments, depositing the read structure, comprises depositing the read structure on at least a portion of the undercoat material.

In various embodiments, the method comprises depositing the thermally conductive pedestal on at least the second portion of the substrate, where the thermally conductive pedestal is capable of providing thermal conduction between the read structure and the substrate. Also, in various embodiments, depositing the read structure, comprises depositing a bottom read shield on at least a portion of the thermally conductive pedestal, depositing an insulating layer on at least a portion of the bottom read shield, and depositing a read element on at least a portion of the insulating layer. In some embodiments, the read element is capable of reading the magnetic fields from the recording medium. Also, in some embodiments, the bottom read shield is capable of at least partially shielding the read element from stray magnetic fields.

In various embodiments, depositing the read structure, comprises depositing an exchange decoupling layer on at least a portion of the thermally conductive pedestal, depositing a bottom read shield on at least a portion of the exchange decoupling layer, depositing an insulating layer on at least a portion of the bottom read shield, and depositing a read element on at least a portion of the insulating layer. In some embodiments, the read element is capable of reading the magnetic fields from the recording medium and the bottom read shield is capable of at least partially shielding the read element from stray magnetic fields.

BRIEF DESCRIPTION OF THE DRAWINGS

FIG. 6 illustrates a side view of a head/media structure in accordance with an embodiment of the present invention with a heating element between a read structure and a write structure;

FIG. 7 illustrates a side view of a head/media structure in accordance with an embodiment of the present invention with a heating element at least partially in an undercoat layer;

DETAILED DESCRIPTION OF PREFERRED EMBODIMENTS

Reference will now be made to the accompanying drawings, which assist in illustrating various pertinent features of embodiments of the present invention. Although embodiments of the present invention will now be described primarily in conjunction with disk drives, it should be expressly understood that embodiments of the present invention may be applicable to other applications where magnetic recording of data is required or desired. In this regard, the following description of a disk drive is presented for purposes of illustration and description. Also, embodiments of the present invention are described in terms of perpendicular recording systems, but the teachings of embodiments of the present invention are readily extended to other systems such as longitudinal recording systems and the like.

Figure 1:
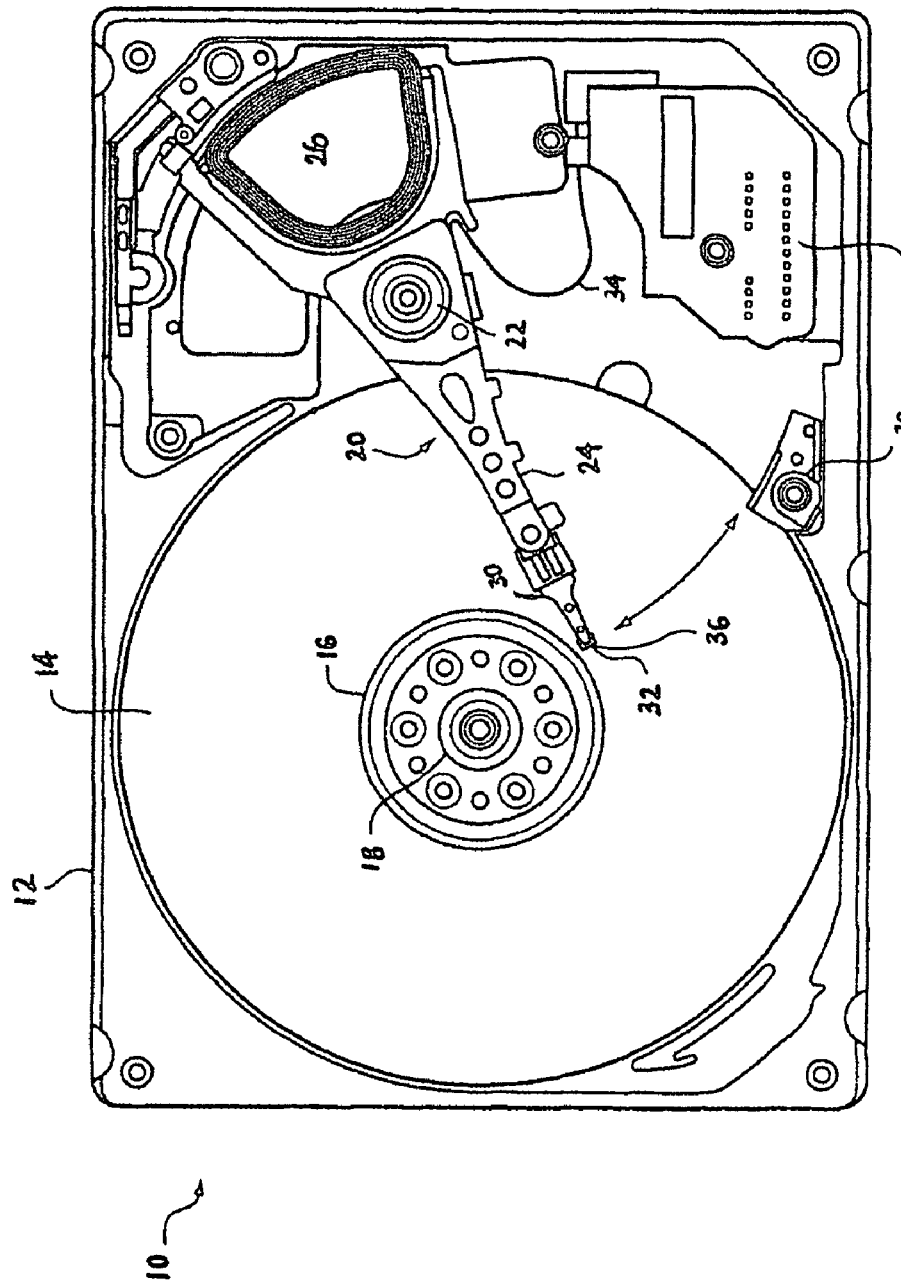
FIG. 1 illustrates a disk drive in accordance with an embodiment of the present invention.

FIG. 1 illustrates a disk drive 10 in accordance with an embodiment of the present invention. The disk drive 10 generally includes a base plate 12 and a cover (not shown) that may be disposed on the base plate 12 to define an enclosed housing or space for various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips, or the like, that cantilever from a common structure. In any case, movement of the actuator arm assembly 20 is provided by an actuator arm drive assembly, such as a voice coil motor 26, or the like. The voice coil motor 26 may be a magnetic assembly that controls the operation of the actuator arm assembly 20 under a direction of control electronics 28.

The actuator arm assembly 20 may further include one or more load beam(s) or suspension(s) 30, where each suspension 30 may be attached to the free end of a respective actuator arm 24 and cantilever therefrom. Typically, the suspension 30 is biased generally toward its corresponding disk 14 by a spring-like force. A slider 32 is disposed at or near the free end of each suspension 30. The biasing forces exerted by the suspension 30 on its corresponding slider 32 thereby attempt to move the slider 32 in the direction of its corresponding disk 14. Typically, this biasing force is such that if the slider 32 were positioned over the corresponding disk 14 without the disk 14 being rotated at a sufficient velocity, the slider 32 would be in contact with the disk 14. The disk drive 10 includes a transducer or head 36 as part of the slider 32 for reading data from and/or writing data to a surface of the disk 14.

The head 36 on the slider 32 is interconnected with the control electronics 28 of the disk drive 10 by a flex cable 34 that is typically mounted on the actuator arm assembly 20. Signals may be exchanged between the head 36 and its corresponding data storage disk 14 for disk drive read/write operations. In this regard, the voice coil motor 26 is utilized to pivot the actuator arm assembly 20 to simultaneously move the slider 32 along a path and across the corresponding data storage disk 14 to position the head 36 at a desired or required radial position on the disk 14 (i.e., at an approximate location of a desired track on the data storage disk 14) for disk drive read/write operations.

When the disk drive 10 is not in operation, the actuator arm assembly 20 may be pivoted to a parked position to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired parking function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or landing on the corresponding data storage disk 14, and the slider 32 would remain on the disk 14 until disk drive operations were re-initiated.

The slider 32 of the disk drive 10 may be configured to "fly" on an air bearing during rotation of its corresponding data storage disk 14 at a sufficient velocity. The slider 32 may be disposed at a pitch angle such that its leading edge is disposed further from its corresponding data storage disk 14 than its trailing edge. The head 36 would typically be incorporated on the slider 32 generally toward its trailing edge since this edge may be positioned closest to its corresponding disk 14. Other pitch angles and orientations could also be utilized for flying the slider 32.

Figure 2:
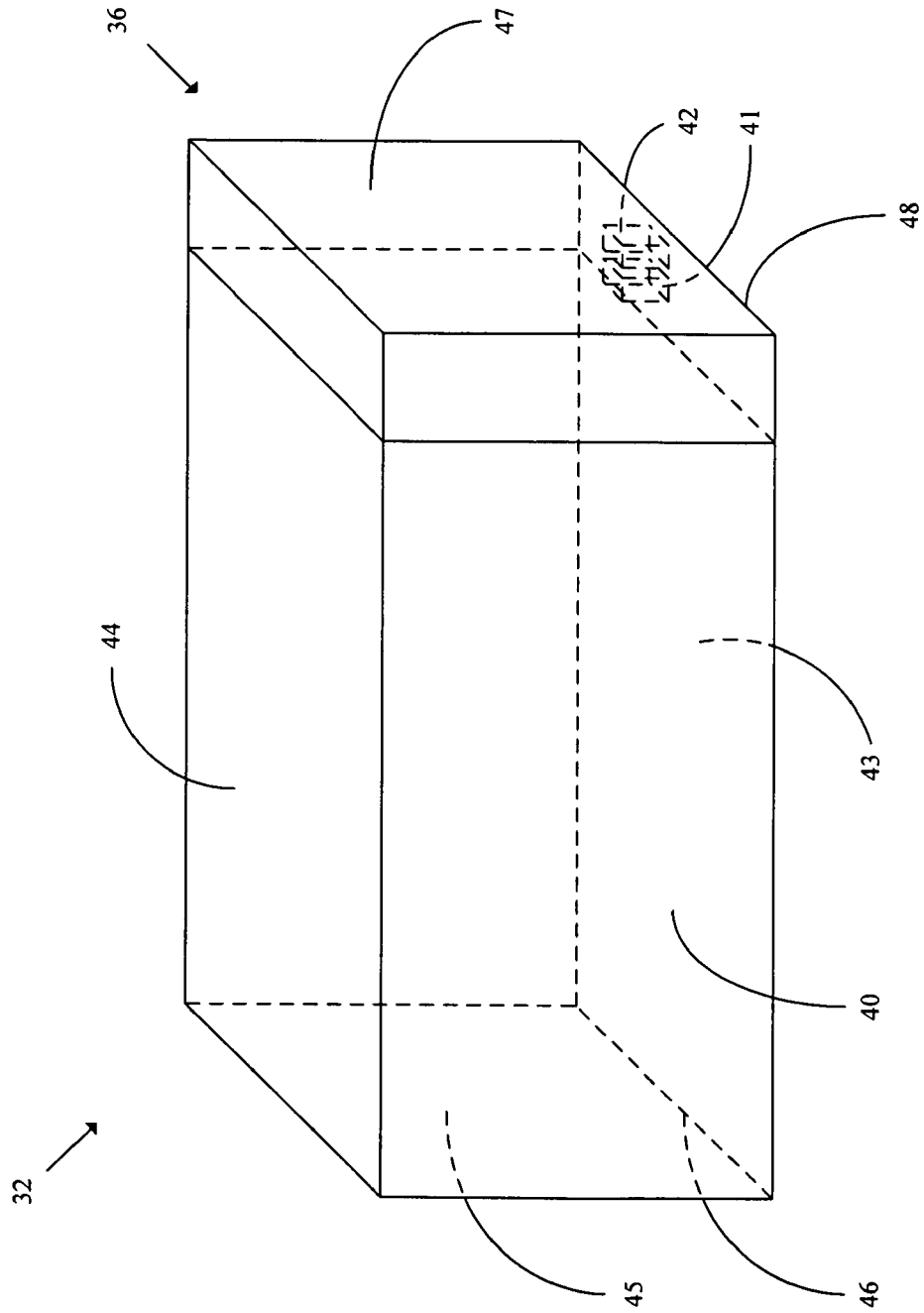
FIG. 2 illustrates a side perspective view of a slider in accordance with an embodiment of the present invention.

FIG. 2 illustrates a side perspective view of an embodiment of the slider 32. The slider 32 comprises a slider body 40 and layers for the head 36, where the slider body 40 may be a substrate of the head 36. The slider body 40 may be formed from various ceramic materials including, but not limited to, a composition of alumina and titanium-carbide, or the like. In various embodiments, the slider body 40 comprises AlTiC, or the like. In various embodiments, the head 36 comprises a read structure 41 and a write structure 42. The read structure 41 allows for reading magnetic fields from the corresponding disk 14 (refer to FIG. 1). The write structure 42 allows for providing magnetic fields to the corresponding disk 14 to write data to the corresponding disk 14.

In various embodiments, the slider 32 has a rectangular box shape with a bottom surface or air bearing surface (ABS) 43, a top surface 44 opposite the ABS 43, a leading surface 45, and a trailing surface 47 opposite the leading surface 45. An air bearing between the ABS 43 of the slider 32 and a surface of the corresponding disk 14 (refer to FIG. 1) allows for the slider 32 to fly over the corresponding disk 14 when the corresponding disk 14 is rotating at a sufficient velocity to generate the air bearing. The slider body 40 may be connected to the actuator arm assembly 20 (refer to FIG. 1) at the top surface 44 of the slider 32. In various embodiments, the actuator arm assembly 20 is in contact with a portion of the top surface 44 of the slider 32 that corresponds to a portion of the slider body 40.

In various embodiments, the slider 32 may be positioned over the corresponding disk 14 (refer to FIG. 1) such that a rotation of the corresponding disk 14 under the slider 32 is in a direction from the leading surface 45 of the slider 32 to the trailing surface 47 of the slider 32. The slider 32 may have a leading edge 46 at an intersection of the leading surface 45 and the ABS 43. Also, the slider 32 may have a trailing edge 48 at an intersection of the trailing surface 47 and the ABS 43.

Figure 3:
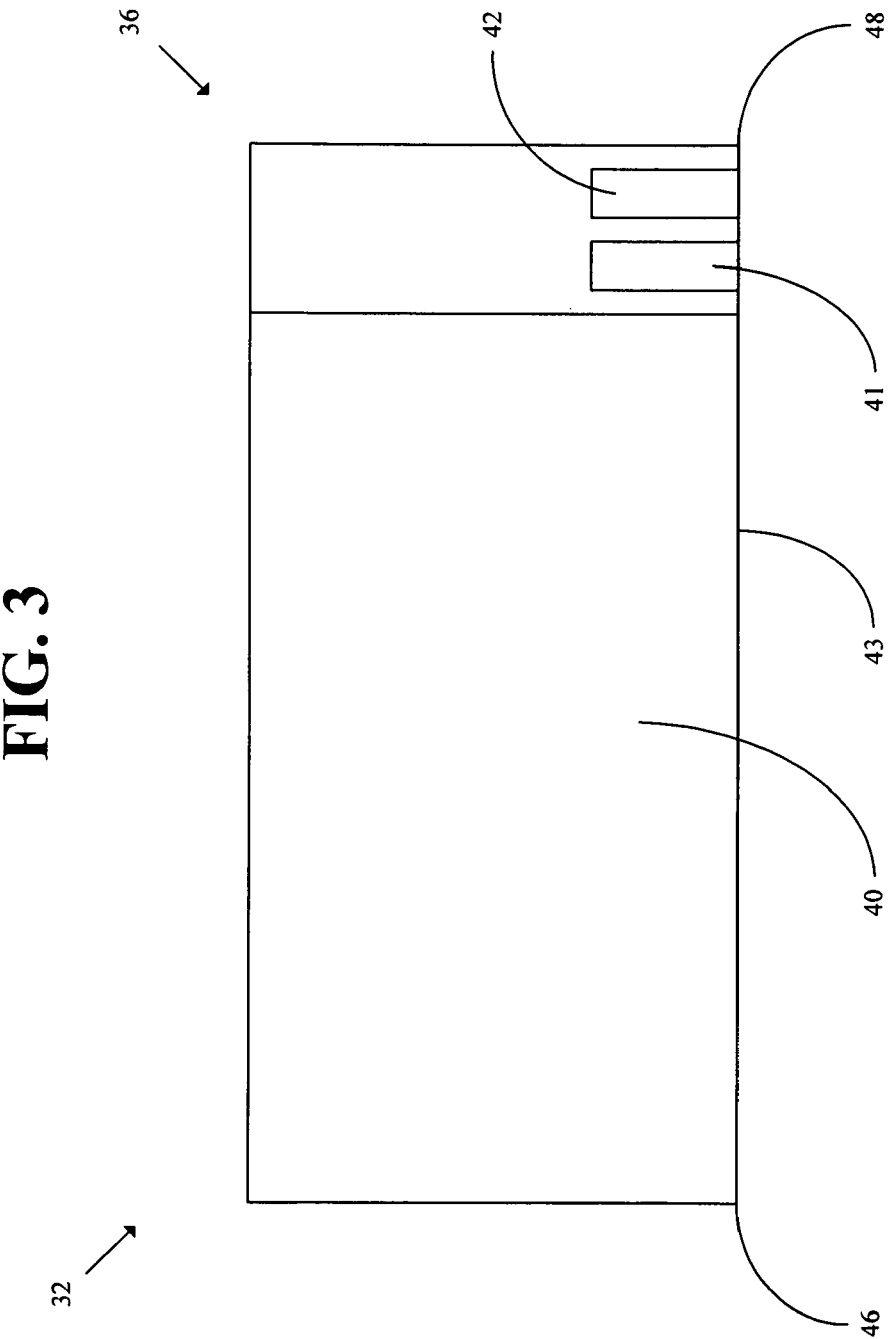
FIG. 3 illustrates a cross-sectional view of a slider in accordance with an embodiment of the present invention.

FIG. 3 illustrates a cross-sectional view of the slider 32 in accordance with an embodiment of the present invention. In various embodiments, a portion of the read structure 41 and a portion of the write structure 42 are located at the ABS 43 of the slider 32. Also, in various embodiments, the read structure 41 and the write structure 42 are located closer to the trailing edge 48 of the slider 32 than to the leading edge 46 of the slider 32. In some embodiments, the slider body 40 is a substrate of the head 36, and the head 36 further includes the read structure 41 and the write structure 42.

Figure 4:
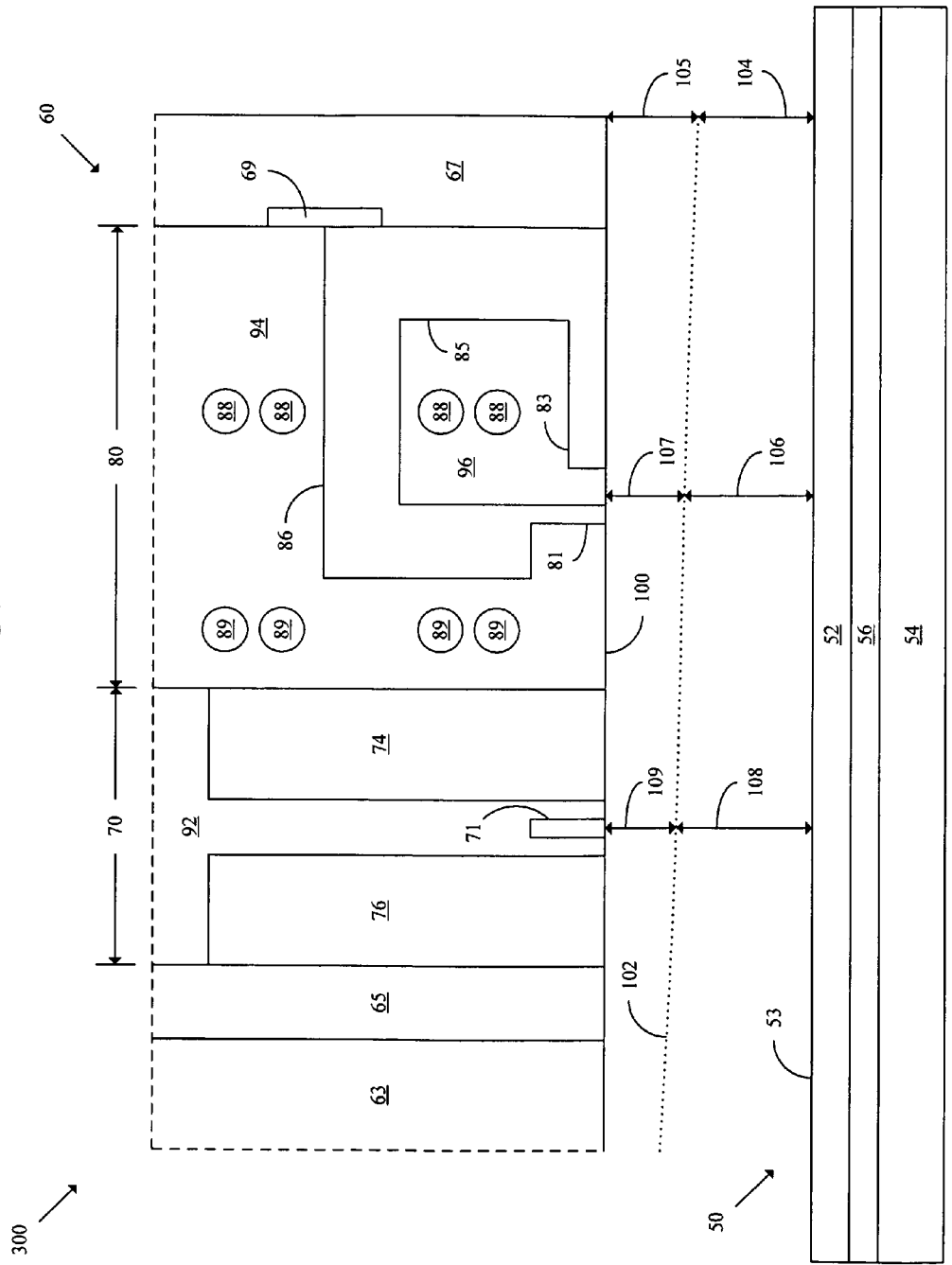
FIG. 4 illustrates a side view of a head/media structure in accordance with an embodiment of the present invention with a heating element at least partially in an overcoat layer.

FIG. 4 illustrates a side view of a head/media structure 300 in accordance with an embodiment of the present invention. The head/media structure 300 comprises a recording medium 50 and a head 60. In various embodiments, the head/media structure 300 may be part of a disk drive, in which case the disk drive may further include similar components as components of the disk drive 10 (refer to FIG. 1), where the recording medium 50 would correspond to the disk 14, and the head 60 would correspond to the head 36. Also, in various embodiments, the head 60 may be part of a slider, such as the slider 32 (refer to FIG. 2) or the like.

The recording medium 50 allows for storing data through magnetization, and comprises a recording layer 52, a soft underlayer (SUL) 54, and a non-magnetic spacer layer 56. In various embodiments, the recording layer 52 comprises a magnetic material with a plurality of grains (not shown) that are oriented perpendicular to the medium, where a magnetization of each grain of the plurality of grains may point either "up" or "down". In various embodiments, the SUL 54 comprises a particular magnetic material that is softer than the magnetic material of the recording layer 52. The recording layer 52 has a top surface 53.

In some embodiments, the recording layer 52 comprises a magnetically hard material with a strong perpendicular magnetic anisotropy, a relatively high coercivity compared to the SUL 54, and a relatively low permeability compared to the SUL 54. Also, in some embodiments, the SUL 54 comprises a magnetically soft material with a lower coercivity than the recording layer 52 and a higher permeability than the recording layer 52. The recording layer 52 is separated from the SUL 54 by the non-magnetic spacer layer 56. During writing operations, a magnetic flux from a write pole 81 of the head 60 may pass vertically through the recording layer 52 to the SUL 54, so as to allow for perpendicular recording by magnetizing one or more of the plurality of grains of the recording layer 52, and then the magnetic flux may return to a write shield 83 and to a write return yoke 85 of the head 60 from the SUL 54.

The head 60 comprises a substrate 63, an undercoat material such as an undercoat layer 65, a read structure 70, a write structure 80, an overcoat layer 67, and a heating element 69. In some embodiments, it is possible for the head 60 to comprise the read structure 70 without the write structure 80. The read structure 70 comprises a read element 71, a top read shield 74, a bottom read shield 76, and a read structure insulation portion 92. The write structure 80 comprises the write pole 81, the write shield 83, the write return yoke 85, a write yoke 86, one or more write coils 88, one or more bucking coils 89, a first write structure insulation portion 94, and a second write structure insulation portion 96. In various embodiments, such as the embodiment illustrated in FIG. 4, the write return yoke 85 is separate from the top read shield 74. However, in various other embodiments, the top read shield 74 of the read structure 70 may also be used as the write return yoke 85 of the write structure 80. The head 60 has an air bearing surface (ABS) 100 that may face the top surface 53 of the recording medium 50 when the head 60 is performing read and write operations.

During writing operations, a current is passed through the one or more write coils 88, which surround a portion of the write yoke 86. As a consequence, a magnetic flux is produced in the write yoke 86 and is focused at the write pole 81, where the magnetic flux passes from the write pole 81 to the recording medium 50 in order to write data to the recording medium 50. The magnetic flux from the write pole 81 that is passed to the recording medium 50 returns from the recording medium 50 to the write shield 83 and to the write return yoke 85 and then from the write return yoke 85 back to the write yoke 86.

A direction of current through the one or more write coils 88 varies depending on a direction of magnetization to be produced in the recording layer 52 for a given bit. When a current is passed through the one or more write coils 88, a current is passed through the one or more bucking coils 89 in an opposite direction from a direction of current in the one or more write coils 88, so as to help prevent a magnetic field from being generated in the read structure 70 due to the current in the one or more write coils 88 and, thus, to aid in decoupling the read structure 70 from the write structure 80. When no data is being written to the recording medium 50, a current purposely applied to the one or more write coils 88 for writing data may be stopped, such that ideally no current would flow through the one or more write coils 88 when not performing write operations.

The read element 71 allows for reading data from the recording medium 50 based on magnetic fields provided from the recording medium 50. The read element 71 may utilize various types of read sensor technologies, such as anisotropic magnetoresistive (AMR), giant magnetoresistive (GMR), tunneling magnetoresistive (TuMR), or the like. The term "magnetoresistive sensor" is used in the present application to encompass all those types of magnetoresistive sensor technologies and any others in which a variation in a resistance of a sensor due to an application of an external magnetic field is detected.

In various embodiments, the read element 71 comprises an AMR read element, where the AMR read element allows for reading data from the recording medium 50 by detecting a change in a magnetic field from the recording medium 50. In other embodiments, the read element 71 comprises a GMR read element, where the GMR read element allows for reading data from the recording medium 50 by directly detecting a magnetic field from the recording medium 50. GMR read elements are typically more sensitive to small magnetic fields than are AMR read elements and, as a result, it may be preferable to use a GMR read element in a perpendicular recording system to improve reading of data. In still other embodiments, the read element 71 comprises a TuMR read element. TuMR read elements are similar to GMR read elements, but various TuMR read elements may rely on spin dependent tunneling currents across an isolation layer, while various GMR read elements may rely on spin dependent scattering mechanisms between two or more magnetic layers.

The top read shield 74 and the bottom read shield 76 each comprise a magnetic material. In various embodiments, the top read shield 74 and the bottom read shield 76 each comprise a magnetically soft material, such as a nickel-iron alloy, or the like. Also, in various embodiments, the top read shield 74 and the bottom read shield 76 have a high permeability to perpendicular magnetic fields, so as to capture stray magnetic fields from the recording medium 50. The read element 71 is located at least partially between the top read shield 74 and the bottom read shield 76. In various embodiments, the read element 71 is located entirely between the top read shield 74 and the bottom read shield 76.

In various embodiments, the top read shield 74 and the bottom read shield 76 are designed to attempt to allow the read element 71 to react to magnetic fields provided by a portion of the recording medium 50 that is directly under the read element 71 during a read operation, by attempting to shield the read element 71 from stray magnetic fields provided from neighboring portions of the recording medium 50. Thus, in various embodiments, the top read shield 74 and the bottom read shield 76 may be designed to capture perpendicular stray magnetic fields to reduce crosstalk between adjacent tracks on the recording medium 50. When the top read shield 74 and the bottom read shield 76 are designed to capture stray magnetic fields from the recording medium 50, they also capture external stray magnetic fields that are produced by sources external to the head/media structure 300.

The substrate 63 is a base layer of the head 60 onto which other layers of the head 60 are deposited to form the head 60. In various embodiments, the substrate 63 may be a portion of a slider body of a slider, such as the slider body 40 of the slider 32 (refer to FIG. 2). In various embodiments, the substrate 63 comprises a ceramic material or the like. Also, in various embodiments, the substrate 63 comprises a thermally conductive material. In some embodiments, the substrate 63 comprises a composition of alumina and titanium-carbide, or the like. In various embodiments, the substrate 63 comprises AlTiC, or the like.

The undercoat layer 65 at least partially provides for electrical insulation between the read structure 70 and the substrate 63. In various embodiments, the undercoat layer 65 comprises a thermally insulating material. Also, in various embodiments, the undercoat layer 65 comprises an electrically insulating material. In some embodiments, the undercoat layer 65 comprises alumina, or the like. Also, in some embodiments, the undercoat layer 65 comprises $Al_2O_3$, or the like. In various embodiments, at least a portion of the undercoat layer 65 is located between a portion of the substrate 63 and a portion of the read structure 70. In some embodiments, at least a first portion of the undercoat layer 65 is in contact with a portion of the bottom read shield 76 and at least a second portion of the undercoat layer 65 is in contact with a portion of the substrate 63. In various embodiments, the undercoat layer 65 has a thickness of between approximately 0.1 µm and 6 µm, although the thickness can be greater or lesser than this range.

The read structure 70 allows for reading magnetic fields from the recording medium 50. In various embodiments, the read structure 70 is located at least partially between a portion of the undercoat layer 65 and a portion of the write structure 80. In some embodiments, the read element 71 is located at least partially between a portion of the top read shield 74 and a portion of the bottom read shield 76. Also, in some embodiments, the bottom read shield 76 is located at least partially between a portion of the undercoat layer 65 and a portion of the top read shield 74. In various embodiments, the read structure insulation portion 92 provides insulation between the bottom read shield 76 and the read element 71 and provides insulation between the read element 71 and the top read shield 74. In some embodiments, the read structure insulation portion 92 covers a top surface of the bottom read shield 76 opposite the ABS 100 and covers a top surface of the top read shield 74 opposite the ABS 100. In some embodiments, the top read shield 74 comprises a ferromagnetic material or the like. Also, in some embodiments, the top read shield 74 comprises a nickel-iron alloy or the like. In some embodiments, the bottom read shield 76 comprises a ferromagnetic material or the like. Also, in some embodiments, the bottom read shield 76 comprises a nickel-iron alloy or the like. In various embodiments, the read structure insulation portion 92 comprises $Al_2O_3$, or the like.

The write structure 80 allows for providing particular magnetic fields to the recording medium 50 to write data to the recording medium 50. In various embodiments, the write structure 80 is located at least partially between a portion of the read structure 70 and a portion of the overcoat layer 67. The first write structure insulation portion 94 surrounds a first portion of the one or more write coils 88, and the second write structure insulation portion 96 surrounds a second portion of the one or more write coils 88. In various embodiments, the first write structure insulation portion 94 and the second write structure insulation portion 96 comprise alumina, or the like. Also, in various embodiments, the first write structure insulation portion 94 and the second write structure insulation portion 96 comprise $Al_2O_3$, or the like. In some embodiments, the write structure 80 comprises the one or more bucking coils 89, where the one or more bucking coils 89 are located at least partially between a portion of the top read shield 74 and a portion of the write yoke 86. Also, in some embodiments, the one or more bucking coils 89 are surrounded by the first write structure insulation portion 94.

The overcoat layer 67 at least partially protects the write structure 80 from direct contact by materials such as dust and other particulates. In various embodiments, the overcoat layer 67 electrically insulates the write structure 80. In some embodiments, the overcoat layer 67 comprises alumina, or the like. Also, in some embodiments, the overcoat layer 67 comprises $Al_2O_3$, or the like. In various embodiments, the heating element 69 is located at least partially in the overcoat layer 67, such as in the embodiment illustrated in FIG. 4. In some embodiments, a surface of the overcoat layer 67 defines a trailing surface of a slider, such as the trailing surface 47 of the slider 32 (refer to FIG. 2).

Figure 5B:
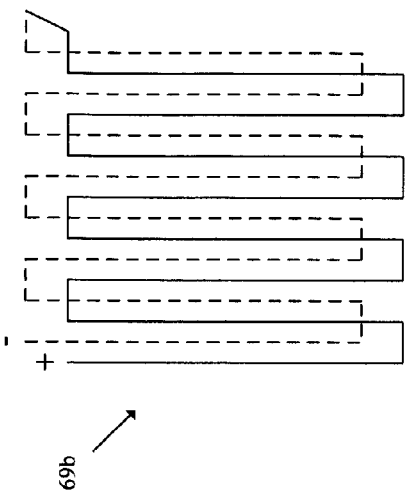
FIG. 5B illustrates an example of a heating element in accordance with an embodiment of the present invention.
Figure 5D:
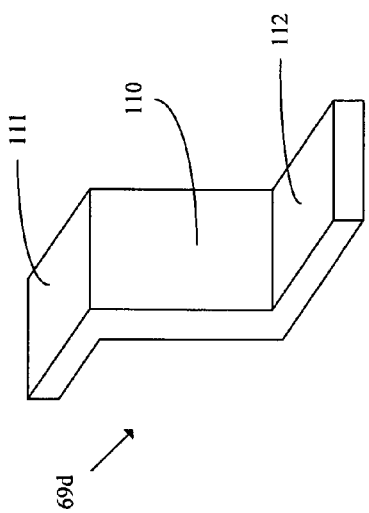
FIG. 5D illustrates an example of a heating element in accordance with an embodiment of the present invention.
Figure 5A:
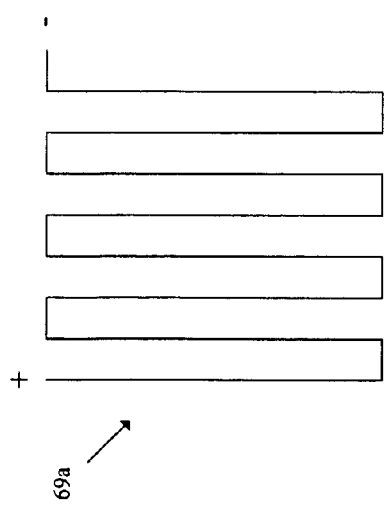
FIG. 5A illustrates an example of a heating element in accordance with an embodiment of the present invention.
Figure 5C:
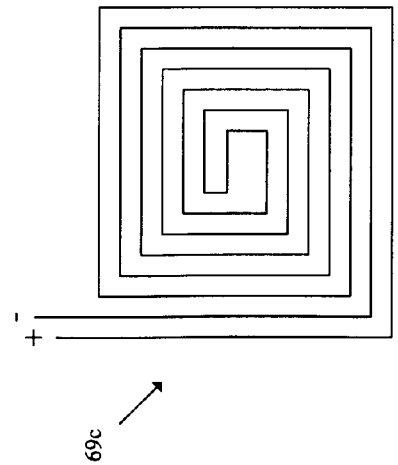
FIG. 5C illustrates an example of a heating element in accordance with an embodiment of the present invention.

The heating element 69 allows for providing heat. In various embodiments, an amount of heat provided by the heating element 69 may be controlled. In some embodiments, the heating element 69 comprises a heating coil structure of a conductive material such as $Ni_{80}Fe_{20}$ (permalloy), $Cu_{60}Ni_{40}$ (constantan), $Cu_{88}Sn_{12}$ (bronze), $Cu_{97.5}Mn_{3.5}$, or the like. Three examples of possible coil structures for the heating element 69 are illustrated in FIGS. 5A, 5B, and 5C, respectively. Also, in some embodiments, the heating element 69 comprises a film heater. An example of a possible film heater for the heating element 69 is illustrated in FIG. 5D.

FIG. 5A illustrates a heating element 69a that is a heating coil having a serpentine path of conductive metal film. FIG. 5B illustrates a heating element 69b that is a heating coil having two serpentine coils like those shown in FIG. 5A, where one coil is illustrated on top of the other coil and there is a connection between the two coils at one end of each coil. The heating element 69b allows for electrical connections to each of the coils to be adjacent to each other, rather than at opposite ends of a structure as with the heating element 69a. In addition, a magnetic field induced by each layer of coils in the combined coil structure of the heating element 69b of FIG. 5B tends to cancel out a magnetic field induced by the opposite coil layer, since the currents flow in opposite directions.

FIG. 5C illustrates a heating element 69c that is a bifilar structure in which a coil remains generally in a single plane, but doubles back on itself, so that current flowing in half of the coil structure is flowing in a generally counter-clockwise direction and in the other half of the coil structure is flowing in a generally clockwise direction. The heating element 69c also allows for reducing a magnetic field induced by a current in the coil structure of the heating element 69c. FIG. 5D illustrates a heating element 69d that is a film heater with a heater film 110, a first lead 111, and a second lead 112. Such a film heater arrangement may be useful in applications where it is desired to use a conductor of a relatively high resistivity.

Referring again to FIG. 4, in various embodiments, a current or voltage is supplied to the heating element 69 by power control circuitry (not shown). In some embodiments, the head/media structure 300 is part of a disk drive, such as the disk drive 10 (refer to FIG. 1), and the power control circuitry is part of the control electronics 28 of the disk drive 10. A power of the heating element 69 may be expressed by the equation $P_H = I_H^2 R_H$, where $P_H$ denotes the power of the heating element 69, $I_H$ denotes a current applied to the heating element 69, and $R_H$ denotes a resistance of the heating element 69. In various embodiments, a current applied to the heating element 69 may be controlled. In some embodiments, the current may be a DC current or a sufficiently low frequency AC current. Also, in some embodiments, current is provided to the heating element 69 by a preamplifier chip (not shown), which also provides current to the read structure 70 and the write structure 80.

When the heating element 69 is actuated by, for example, providing a current or voltage to the heating element 69, at least some portions of the head 60 expand due to heat provided by the heating element 69. This expansion causes the ABS 100 of the head 60 to distort so as to allow the ABS 100 of the head 60 to be closer to the top surface 53 of the recording medium 50. An example of a distortion of the ABS 100 of the head 60 is illustrated by a dotted line 102 in FIG. 4. As is illustrated by the dotted line 102, the ABS 100 may not be distorted evenly when the heating element 69 provides heat. Instead, some portions of the head 60 may be displaced greater distances toward the top surface 53 of the recording medium 50 than other portions of the head 60. Such differences in displacement may be due to differences in coefficients of thermal expansion of different materials in the head 60, and may be due to the placement of the heating element 69, because material in the head 60 located closer to the heating element 69 may be provided with more heat than material in the head 60 located farther from the heating element 69.

When the heating element 69 provides heat to cause a displacement of the ABS 100 of the head 60 to, for example, the dotted line 102, there are different displacements of the overcoat layer 67, the write structure 80, and the read structure 70. After the displacement of the ABS 100 of the head 60, the smallest distance between the displaced ABS 102 and the top surface 53 of the recording medium 50 is known as the minimum flying height (min FH). In FIG. 4, the min FH is indicated by a double-sided arrow 104 between the dotted line 102 and the top surface 53 of the recording medium 50. It is common for the min FH to occur at a trailing edge of a slider. In various embodiments, a surface of the overcoat layer 67 that is opposite a surface of the overcoat layer 67 facing the write structure 80 is a trailing surface of a slider, such as the trailing surface 47 of the slider 32 (refer to FIG. 2). Thus, a trailing edge displacement of a slider including the head 60, such as the slider 32 (refer to FIG. 2), is indicated in FIG. 4 by a double-sided arrow 105 between an original position of the ABS 100 at an end of the overcoat layer 67 and the dotted line 102 for the displaced ABS of the head 60 at an end of the overcoat layer 67.

Moreover, after the displacement of the ABS 100 of the head 60, a distance between the read element 71 and the top surface 53 of the recording medium 50 is known as the read gap flying height (read gap FH). In FIG. 4, the read gap FH is indicated by a double-sided arrow 108 between the dotted line 102 for the displaced ABS of the read structure 70 and the top surface 53 of the recording medium 50. A read gap displacement is an amount that the ABS 100 is displaced at the location of the read element 71 and is indicated in FIG. 4 by a double-sided arrow 109 between the ABS 100 at the read element 71 and the dotted line 102 for the displaced ABS of the head 60.

Also, after the displacement of the ABS 100 of the head 60, a distance between the write structure 80, in a region between the write pole 81 and the write shield 83, and the top surface 53 of the recording medium 50 is known as the write gap flying height (write gap FH). In FIG. 4, the write gap FH is indicated by a double-sided arrow 106 between the dotted line 102 for the displaced ABS of the write structure 80 and the top surface 53 of the recording medium 50. A write gap displacement is an amount that the ABS 100 is displaced at the write structure 80, between the write pole 81 and the write shield 83, and is indicated in FIG. 4 by a double-sided arrow 107 between the ABS 100 at the write structure 80 and the dotted line 102 for the displaced ABS of the head 60.

A difference between the read gap FH 108 and the min FH 104 is known as the read gap to minimum flying height (read gap-to-min FH) difference. The read gap-to-min FH difference may also be calculated as a difference between the read gap displacement 109 and the trailing edge displacement 105 when the min FH is at the trailing edge of the head 60. Similarly, a difference between the write gap FH 106 and the min FH 104 is known as the write gap to minimum flying height (write gap-to-min FH) difference. The write gap-to-min FH difference may also be calculated as a difference between the write gap displacement 107 and the trailing edge displacement 105 when the min FH is at the trailing edge of the head 60.

A slider leading edge displacement is a displacement of a slider leading edge, such as the leading edge 46 of the slider 32 (refer to FIG. 2), when an ABS of the slider is displaced. A read gap flying height adjustment efficiency value ($FHA_R$) is defined as a difference between the read gap displacement 109 and the slider leading edge displacement for a given input power of the heating element 69. Similarly, a write gap flying height adjustment efficiency value ($FHA_W$) is defined as a difference between the write gap displacement 107 and the slider leading edge displacement for a given input power of the heating element 69. The $FHA_R$ and the $FHA_W$ may be expressed in microinches per mW, where 1 microinch is equivalent to 25.4 nm. The $FHA_R$ and the $FHA_W$ may be used as a measure of efficiency of flying height adjustment.

A simulation was performed for a slider having a heater located in an overcoat layer of a head of the slider. The simulation was performed to simulate a 55Ω NiCu heater as a heating element located 50 μm off an ABS of the slider in the overcoat layer and 10 μm from a top of a write shield. A simulation power of the heater was $P_H$=100 mW DC. It should be understood that the values employed for the simulation are not intended to limit embodiments of the present invention. The simulation was performed for a steady state, flying on media, condition of the slider.

As a result of the simulation, a read gap displacement was −40.1 nm, a write gap displacement was −44.7 nm, and a trailing edge displacement at a trailing edge of the slider was −48.2 nm. The min FH of the simulation was at the trailing edge of the slider. Thus, the write gap-to-min FH difference in the simulation was −3.5 nm (=−48.2 nm+44.7 nm). The leading edge displacement of the slider in the simulation was −21.8 nm. As a result, the $FHA_R$ of the simulation was −0.72 microinches (=[−40.1 nm+21.8 nm]*[1 microinch/25.4 nm]) per 100 mW. Also, in the simulation, a maximum change in temperature at the heater in the slider ($\Delta T^{max}$) was 141.1° C., and a change in temperature of a read element of the slider ($\Delta T_R$) was 15.4° C.

FIG. 6 illustrates a head/media structure 310 in accordance with an embodiment of the present invention. Elements that are similar between the head/media structure 310 and the head/media structure 300 (refer to FIG. 4) are labeled with the same numeric labels for simplicity. The head/media structure 310 comprises the recording medium 50 and a head 120. The recording medium 50 comprises the recording layer 52, the SUL 54, and the non-magnetic spacer layer 56. The recording layer 52 has the top surface 53. The head 120 comprises the substrate 63, the undercoat layer 65, the read structure 70, the write structure 80, the overcoat layer 67, and the heating element 69. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 120 has the ABS 100.

The head 120 differs from the head 60 (refer to FIG. 4) in that the heating element 69 in the head 120 is located between the one or more write coils 88 and the read structure 70, while the heating element 69 in the head 60 is located at least partially in the overcoat layer 67. In various embodiments, the heating element 69 is located between the read structure 70 and the write structure 80.

Placing the heating element 69 between the read structure 70 and the write structure 80 may allow for reducing a read gap-to-min FH difference and for reducing a write gap-to-min FH difference as compared with the placement of the heating element 69 in the overcoat layer 67. However, placing the heating element 69 between the read structure 70 and the write structure 80 may result in a loss in read gap flying height adjustment efficiency and a loss in write gap flying height adjustment efficiency as compared with the placement of the heating element 69 in the overcoat layer 67. Thus, placing the heating element 69 between the read structure 70 and the write structure 80 may result in reduced gap-to-min FH differences, but may also cause a loss in flying height adjustment efficiency as compared with the placement of the heating element 69 in the overcoat layer 67. In addition, placing the heating element 69 between the read structure 70 and the write structure 80 may lead to excessive heating of the read element 71, which may cause a reliability problem.

FIG. 7 illustrates a head/media structure 320 in accordance with an embodiment of the present invention. Elements that are similar between the head/media structure 320 and the head/media structure 300 (refer to FIG. 4) are labeled with the same numeric labels for simplicity. The head/media structure 320 comprises the recording medium 50 and a head 130. The recording medium 50 comprises the recording layer 52, the SUL 54, and the non-magnetic spacer layer 56. The recording layer 52 has the top surface 53. The head 130 comprises the substrate 63, the undercoat layer 65, the read structure 70, the write structure 80, the overcoat layer 67, and the heating element 69. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 130 has the ABS 100.

The head 130 differs from the head 60 (refer to FIG. 4) in that the heating element 69 in the head 130 is located at least partially in the undercoat layer 65, while the heating element 69 in the head 60 is located at least partially in the overcoat layer 67. In various embodiments, the heating element 69 is located at least partially between the substrate 63 and the read structure 70. In some embodiments, the heating element 69 is located completely within the undercoat layer 65. Also, in various embodiments, the heating element 69 is located at least partially in the undercoat layer 65 and a portion of the heating element 69 is in contact with the bottom read shield 76 of the read structure 70. In various embodiments, the heating element 69 may be located at any specified height from the ABS 100 of the head 130 in the undercoat layer 65.

In some embodiments, the heating element 69 is controllable for selectively heating at least a particular portion of the read structure 70. Also, in some embodiments, the read structure 70 is formed such that the read structure 70 is capable of expanding at the ABS 100 of the head 130 when at least the particular portion of the read structure 70 is heated by the heating element 69. In various embodiments, the heating element 69 is controllable for selectively heating at least a portion of the write structure 80. Also, in various embodiments, the write structure 80 is formed such that the write structure 80 is capable of expanding at the ABS 100 of the head 130 when at least the portion of the write structure 80 is heated by the heating element 69.

Placing the heating element 69 at least partially in the undercoat layer 65 may allow for reducing a read gap-to-min FH difference and for reducing a write gap-to-min FH difference as compared with the placement of the heating element 69 at least partially in the overcoat layer 67. Also, placing the heating element 69 at least partially in the undercoat layer 65 may allow for reducing a read gap-to-min FH difference and for reducing a write gap-to-min FH difference as compared with the placement of the heating element 69 between the read structure 70 and the write structure 80. Indeed, placing the heating element 69 at least partially in the undercoat layer 65 may provide for a minimum read gap-to-min FH difference and for a minimum write gap-to-min FH difference. This is at least partially because the heating element 69 in the undercoat layer 65 is located farther away from a trailing edge of the head 130 than when the heating element 69 is located in the overcoat layer 67, which provides for smaller gap-to-min FH differences due to differences in a spreading of heat from the heating element 69 in the head 130.

By providing a smaller read gap-to-min FH difference, the read structure 70 is positioned closer to the recording medium 50 than in the case of a same min FH but a greater read gap-to-min FH difference. Similarly, by providing a smaller write gap-to-min FH difference, the write structure 80 is positioned closer to the recording medium 50 than in the case of a same min FH but a greater write gap-to-min FH difference. Placing the read structure 70 and the write structure 80 of the head 130 closer to the recording medium 50 allows for increasing a magnetic storage density of the recording medium 50.

However, when the heating element 69 is located at least partially in the undercoat layer 65 and the undercoat layer 65 has a traditional thickness for an undercoat layer, there may be a loss in flying height adjustment efficiency as compared with the placement of the heating element 69 in the overcoat layer 67. This is at least partially due to a greater transfer of heat from the heating element 69 to the substrate 63. However, flying height adjustment efficiency when the heating element 69 is located at least partially in the undercoat layer 65 may be improved by increasing a thickness of the undercoat layer 65, as will be further discussed below with reference to FIG. 8.

Figure 8:
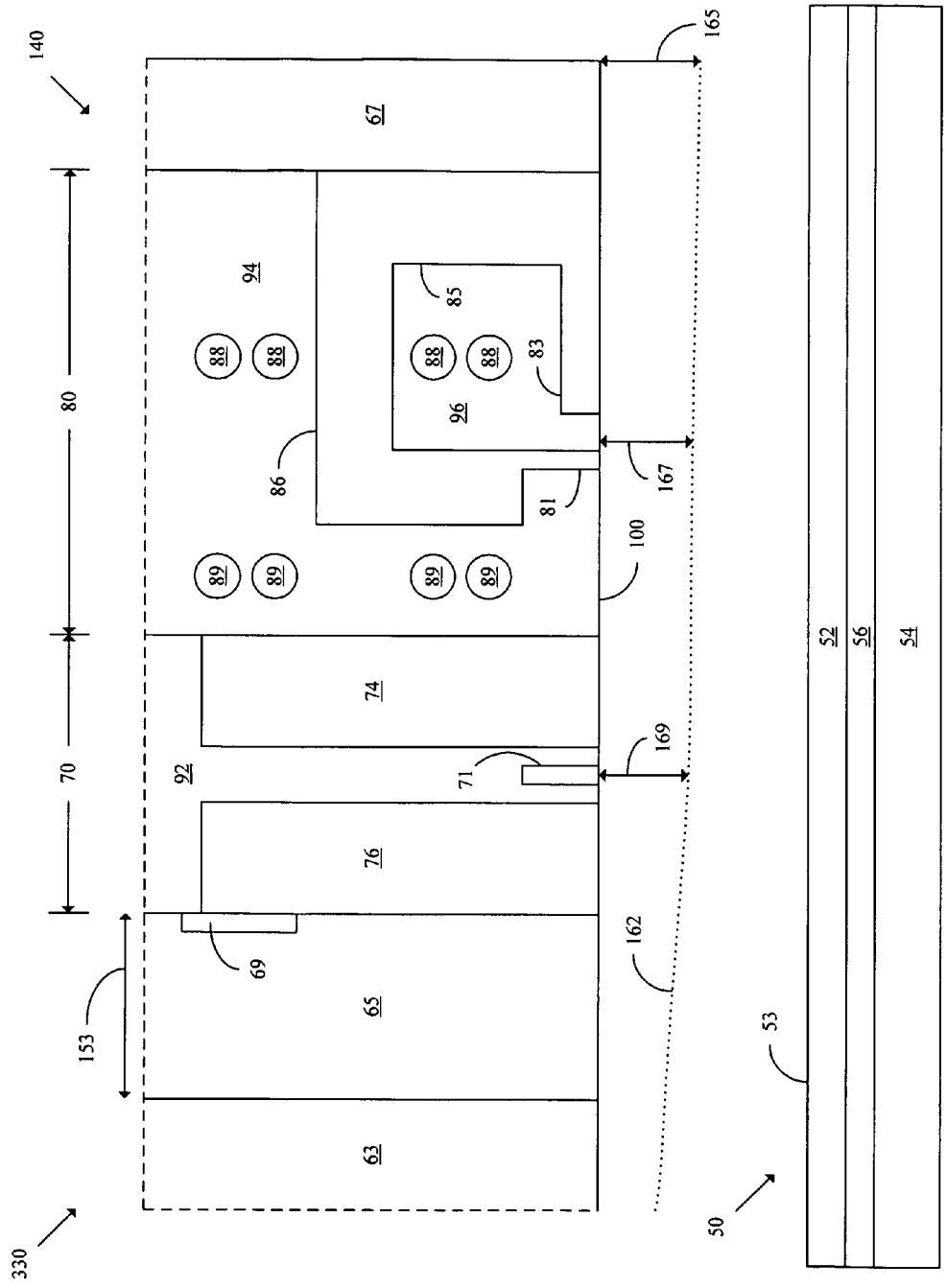
FIG. 8 illustrates a side view of a head/media structure in accordance with an embodiment of the present invention with a heating element at least partially in a thick undercoat layer.

FIG. 8 illustrates a head/media structure 330 in accordance with an embodiment of the present invention. Elements that are similar between the head/media structure 330 and the head/media structure 300 (refer to FIG. 4) are labeled with the same numeric labels for simplicity. The head/media structure 330 comprises the recording medium 50 and a head 140. The recording medium 50 comprises the recording layer 52, the SUL 54, and the non-magnetic spacer layer 56. The recording layer 52 has the top surface 53. The head 140 comprises the substrate 63, the undercoat layer 65, the read structure 70, the write structure 80, the overcoat layer 67, and the heating element 69. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 140 has the ABS 100.

The heating element 69 of the head 140 is located at least partially in the undercoat layer 65. The head 140 differs from the head 130 (refer to FIG. 7) in that the undercoat layer 65 of the head 140 is thicker than the undercoat layer 65 of the head 130. A thickness of the undercoat layer 65 of the head 140 is indicated by a double-sided arrow 153. The undercoat layer 65 of the head 140 allows for at least partially providing electrical insulation between the read structure 70 and the substrate 63.

In various embodiments, the thickness 153 of the undercoat layer 65 in a direction from the substrate 63 to the read structure 70 is greater than 10 μm. Also, in various embodiments the thickness 153 of the undercoat layer 65 in a direction from the substrate 63 to the read structure 70 is greater than 20 μm. In some embodiments, the thickness 153 of the undercoat layer 65 is greater than 30 μm. Also, in some embodiments, the thickness 153 of the undercoat layer 65 is greater than a thickness of the read structure 70.

By forming the undercoat layer 65 with a thermally insulative material and increasing the thickness 153 of the undercoat layer 65, a flying height adjustment efficiency may be improved when the heating element 69 is located at least partially in the undercoat layer 65, because there may be more thermal insulation between the heating element 69 and the substrate 63 so that less heat would be transferred to the substrate 63 and more heat would be transferred to other layers of the head 140. In various embodiments, the thickness 153 of the undercoat layer 65 of the head 140 is set such as to obtain a desired flying height adjustment efficiency when the heating element 69 is actuated to provide heat. Moreover, by increasing the thickness 153 of the undercoat layer 65, a flying height adjustment efficiency may be improved, because there would be an increase in a volume of material in the undercoat layer 65 for protrusion when heated.

When the heating element 69 of the head 140 is actuated to provide heat, the ABS 100 of the head 140 protrudes outward. For example, positions of the ABS 100 of the head 140 may be displaced to positions indicated by the dotted line 162 when the heating element 69 provides heat to the head 140. A trailing edge displacement is indicated by a double-sided arrow 165 between the original ABS 100 at the trailing edge of the head 140 and the displaced ABS 162. A read gap displacement is indicated by a double-sided arrow 169 between the ABS 100 at the read structure 70 and the displaced ABS 162. A write gap displacement is indicated by a double sided arrow 167 between the ABS 100 at the write structure 80 and the displaced ABS 162.

A simulation was performed for a slider having a heater located in a thick undercoat layer of a head of the slider. The simulation was performed to simulate a 55Ω NiCu heater as a heating element located 50 μm off an ABS of the slider in the undercoat layer and next to a bottom read shield. A simulation thickness of the undercoat layer was greater than 20 μm. A simulation power of the heater was $P_H$=100 mW DC. It should be understood that the values employed for the simulation are not intended to limit embodiments of the present invention. The simulation was performed for a steady state, flying on media, condition of the slider.

As a result of the simulation, a read gap displacement was −46.1 nm, a write gap displacement was −49.5 nm, and a trailing edge displacement at a trailing edge of the slider was −51.3 nm. The min FH of the simulation was at the trailing edge of the slider. Thus, the write gap-to-min FH difference in the simulation was −1.8 nm (=−51.3 nm+49.5 nm). The leading edge displacement of the slider in the simulation was −19.9 nm. As a result, the $FHA_R$ of the simulation was −1.03 microinches (=[−46.1 nm+19.9 nm]*[1 microinch/25.4 nm]) per 100 mW. Also, in the simulation, a maximum change in temperature at the heater in the slider ($\Delta T^{max}$) was 111.0° C., and a change in temperature of a read element of the slider ($\Delta T_R$) was 21.2° C.

It is instructive to compare the simulation results for the heater in the thick undercoat layer with the simulation results for the heater in the overcoat layer. With the heater in the thick undercoat layer, the write gap-to-min FH difference was −1.8 nm, while the write gap-to-min FH difference was −3.5 nm with the heater in the overcoat layer. Thus, the write gap-to-min FH difference was reduced by 49% by placing the heater in the thick undercoat layer rather than in the overcoat layer. With the heater in the thick undercoat layer, the $FHA_R$ was −1.03 microinches per 100 mW, while the $FHA_R$ was −0.72 microinches per 100 mW with the heater in the overcoat layer. Thus, the flying height adjustment efficiency at the read gap was increased by 43% by placing the heater in the thick undercoat layer rather than in the overcoat layer. Therefore, placing the heater in the thick undercoat layer may greatly reduce gap-to-min FH difference and may greatly improve flying height adjustment efficiency.

However, in the simulations, with the heater in the thick undercoat layer, the $\Delta T_R$ was 21.2° C., while the $\Delta T_R$ was 15.4° C. with the heater in the overcoat layer. Thus, the change in temperature of the read element increased by 38% when the heater was placed in the thick undercoat layer rather than in the overcoat layer. In general, as an operating temperature of a read element is increased, an expected lifetime of operation of the read element decreases. Another concern with a thick undercoat layer is a possibility of greater write pole tip protrusion (WPTP) due to heat generated by one or more coils of a write structure during write operations, because the write structure and read structure may be more thermally insulated from a substrate, where the substrate would normally act to drain heat away from the write structure and read structure. The issues of read element temperature increase and WPTP increase due to a thick undercoat layer are considered below with reference to FIG. 9. Then, the use of a thermally conductive pedestal in a thick undercoat layer is proposed as a solution to the issues of read element temperature increase and WPTP increase, where the pedestal is discussed further below with reference to FIG. 10.

Figure 9:
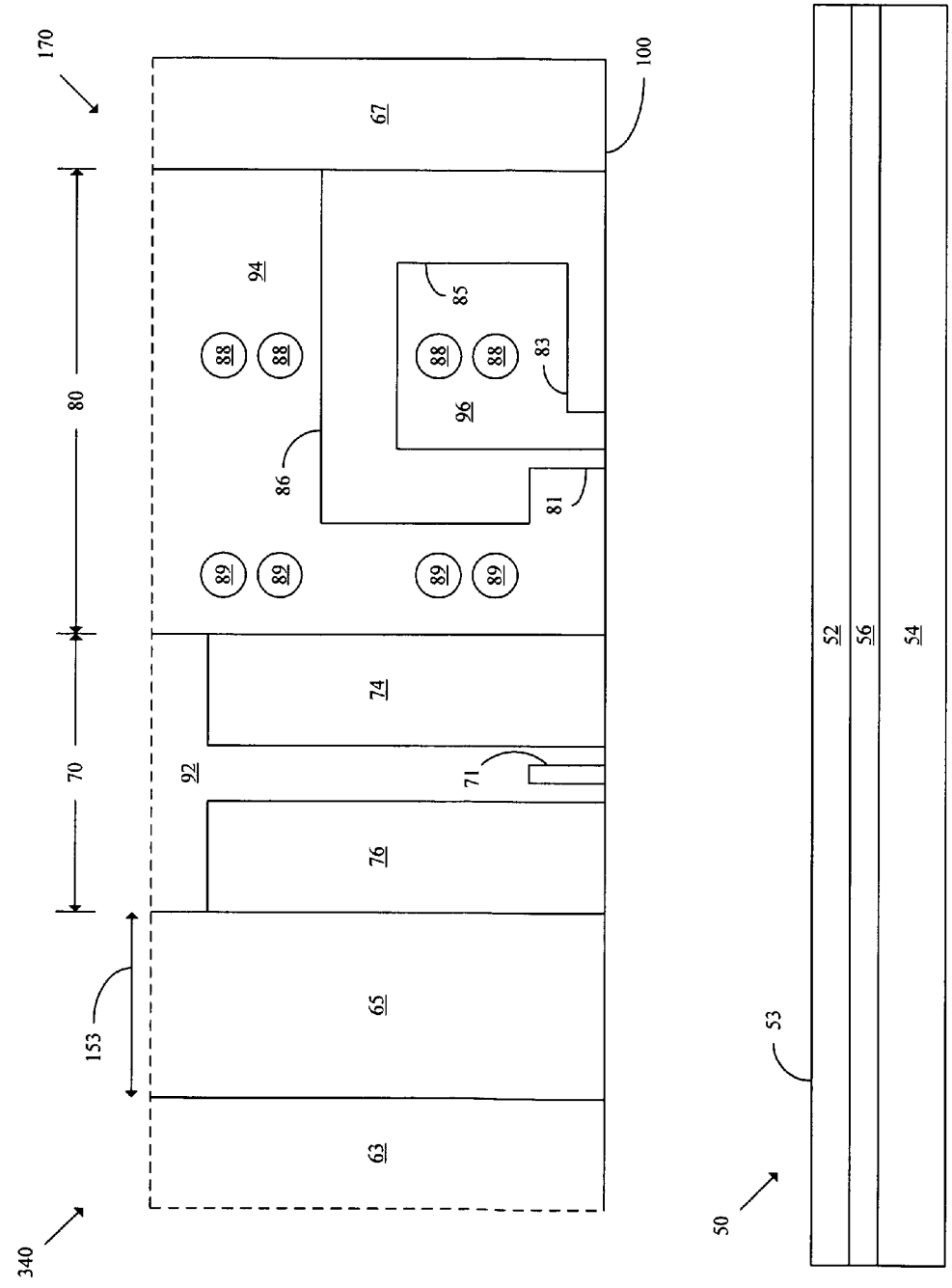
FIG. 9 illustrates a side view of a head/media structure in accordance with an embodiment of the present invention with a thick undercoat layer.

FIG. 9 illustrates a head/media structure 340 in accordance with an embodiment of the present invention. Elements that are similar between the head/media structure 340 and the head/media structure 300 (refer to FIG. 4) are labeled with the same numeric labels for simplicity. The head/media structure 340 comprises the recording medium 50 and a head 170. The recording medium 50 comprises the recording layer 52, the SUL 54, and the non-magnetic spacer layer 56. The recording layer 52 has the top surface 53. The head 170 comprises the substrate 63, the undercoat layer 65, the read structure 70, the write structure 80, and the overcoat layer 67. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 170 has the ABS 100.

The undercoat layer 65 of the head 170 comprises a thermally insulative material and is formed to be thick. In various embodiments, the thickness 153 of the undercoat layer 65 of the head 170 is greater than 10 μm. In some embodiments, the thickness 153 of the undercoat layer 65 of the head 170 is greater than 20 μm. Also, in some embodiments, the thickness 153 of the undercoat layer 65 of the head 170 is greater than 30 μm. By increasing the thickness 153 of the undercoat layer 65, there is more thermal insulation between the read structure 70 and the substrate 63, and there is more thermal insulation between the write structure 80 and the substrate 63.

When a write operation is performed by the head 170, a current is passed through the one or more write coils 88. The current passed through the one or more write coils 88 generates heat that is spread to the surrounding layers of the head 170. The heat provided from the one or more write coils 88 during write operations may cause a protrusion of the read structure 70 at the ABS 100, known as reader pole tip protrusion ($PTP_R$), and may cause a protrusion of the write structure 80 at the ABS 100, known as writer pole tip protrusion ($PTP_W$). Reader pole tip protrusion and writer pole tip protrusion may be undesirable, because the pole tip protrusion may occur during writing operations without the ability to control the protrusion, and such pole tip protrusion may lead to contact between the head 170 and the recording medium 50. Contact between the head 170 and the recording medium 50 may cause damage to the head 170 and may cause damage to the recording medium 50, which would reduce disk drive reliability.

A simulation was performed for a slider having a typically sized undercoat layer of 0.3 μm to measure pole tip protrusion due to a write current passed through write coils. Then, another simulation was performed for a slider having a thick undercoat layer of 20.3 μm to provide for a comparison of an amount of pole tip protrusion. It should be understood that the values employed for the simulations are not intended to limit embodiments of the present invention. The simulations were performed with a write current of 80 mA DC, and were performed for a steady state, flying on media, condition of the slider.

It is instructive to compare the simulation results for the typically sized undercoat layer with the simulation results for the thick undercoat layer. With the typically sized undercoat layer, the change in temperature of a read element ($\Delta T_R$) due to the write current in the write coils was 6.01° C., while the $\Delta T_R$ was 14.87° C. with the thick undercoat layer. Thus, the $\Delta T_R$ increased by 147% with the thick undercoat layer as compared with the typically sized undercoat layer. With the typically sized undercoat layer, the $PTP_R$ was 5.16 nm, while the $PTP_R$ was 8.95 nm with the thick undercoat layer. Also, with the typically sized undercoat layer, a protrusion at a slider leading edge was 2.06 nm, while the protrusion at the slider leading edge was 1.40 nm with the thick undercoat layer. As a consequence, read gap WPTP was 3.10 nm (=5.16 nm−2.06 nm) for the typically sized undercoat layer, and read gap WPTP was 7.55 nm (=8.95 nm−1.40 nm) for the thick undercoat layer. Therefore, read gap WPTP increased by 144% with the thick undercoat layer as compared with the typically sized undercoat layer.

The read element temperature increase due to the heat generated by the write current may be undesirable, because an increase in an operation temperature of a read element may decrease a working life expectancy of the read element. Also, the increase in read gap WPTP may be undesirable, because such uncontrolled pole tip protrusion during write operations may lead to unwanted contact between the slider and a recording medium. However, as explained above, the thick undercoat layer is beneficial in reducing write gap-to-min FH difference and increasing flying height adjustment efficiency when performing flying height adjustment with a controlled heating element. In order to maintain the benefits of the thick undercoat layer and to limit the side effects of read element temperature increase and WPTP, a thermally conductive pedestal may be placed in the thick undercoat layer, as is illustrated in FIG. 10.

Figure 10:
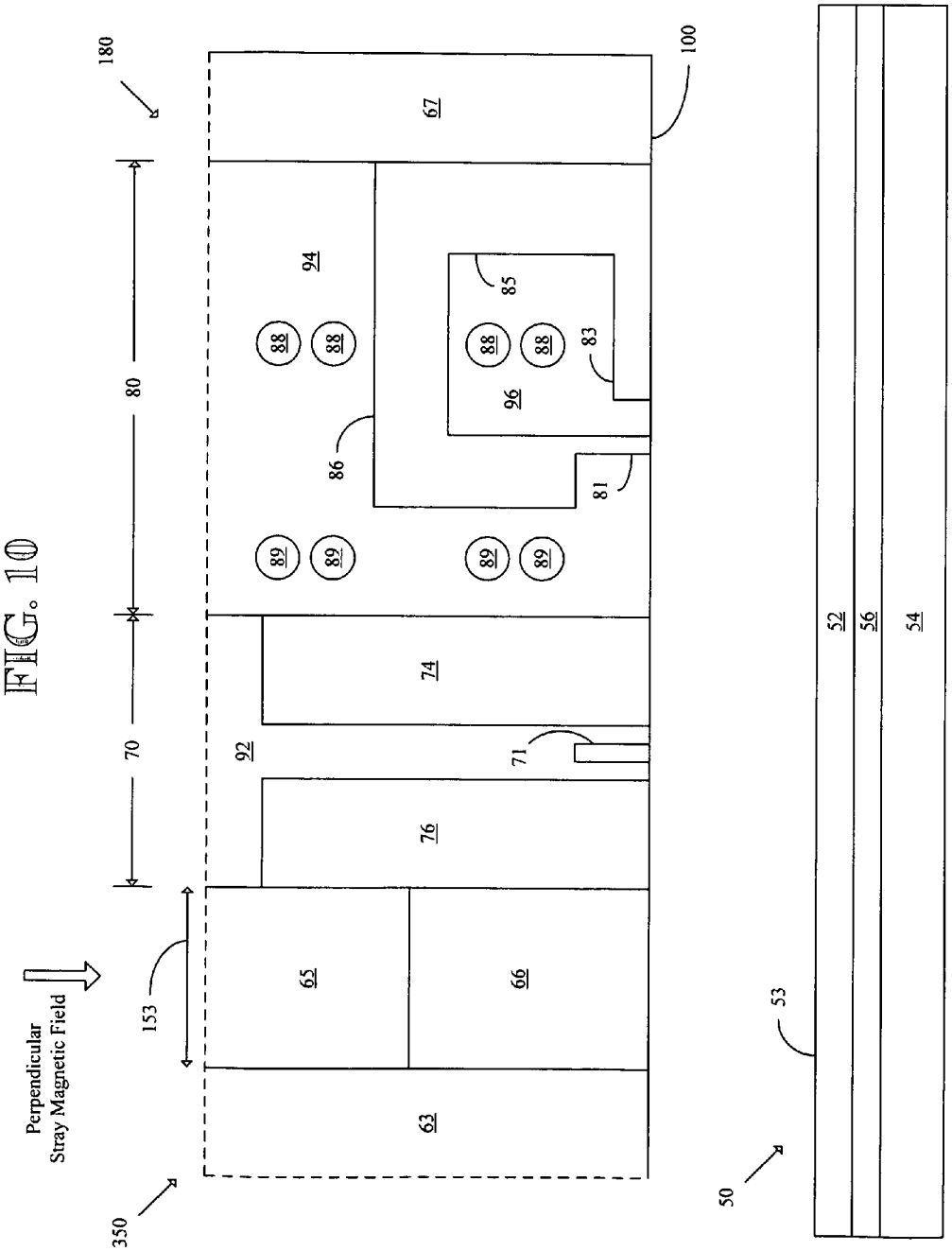
FIG. 10 illustrates a side view of a head/media structure in accordance with an embodiment of the present invention with a pedestal.

FIG. 10 illustrates a head/media structure 350 in accordance with an embodiment of the present invention. Elements that are similar between the head/media structure 350 and the head/media structure 300 (refer to FIG. 4) are labeled with the same numeric labels for simplicity. The head/media structure 350 comprises the recording medium 50 and a head 180. The recording medium 50 comprises the recording layer 52, the SUL 54, and the non-magnetic spacer layer 56. The recording layer 52 has the top surface 53. The head 180 comprises the substrate 63, the undercoat layer 65, a pedestal 66, the read structure 70, the write structure 80, and the overcoat layer 67. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 180 has the ABS 100.

In various embodiments, the pedestal 66 at least partially provides thermal conduction between the read structure 70 and the substrate 63 of the head 180. In some embodiments, the pedestal 66 comprises a thermally conductive material, or the like. In various embodiments, the pedestal 66 comprises a nickel-iron alloy, or the like. Also, in various embodiments, the pedestal 66 comprises $Ni_{36}Fe_{64}$ (invar), or the like. In some embodiments, the pedestal 66 comprises a NiFe invar like alloy where a Ni composition of the alloy is between 30 and 45 atomic percent, or the like. Also, in some embodiments, the pedestal 66 comprises any material with high thermal conductivity, such as AlTiC, or the like.

In various embodiments, the pedestal 66 is located at least partially between the read structure 70 and the substrate 63. In some embodiments, a first portion of the pedestal 66 is in contact with the substrate 63 and a second portion of the pedestal 66 is in contact with the bottom read shield 76. Also, in some embodiments, the pedestal 66 is located at least partially in the undercoat layer 65. In various embodiments, a thickness of the pedestal is a same thickness as the thickness 153 of the undercoat layer 65. In some embodiments, a thickness of the pedestal 66 is greater than 5 µm. Also, in some embodiments, a thickness of the pedestal 66 is greater than 20 µm. In some embodiments, a height of the pedestal 66 is at least half of a height of the bottom read shield 76. Also, in some embodiments, a height of the pedestal 66 is approximately a same height as a height of the bottom read shield 76.

When the pedestal 66 comprises a thermally conductive material and the undercoat layer 65 comprises a thermally insulative material and the pedestal 66 is placed in the undercoat layer 65, the pedestal 66 provides for enhancing heat dissipation from the read structure 70 and the write structure 80 to the substrate 63. As a consequence, such a pedestal 66 may allow for reducing WPTP and for reducing read element temperature increase. In various embodiments, the pedestal 66 is located in the thick undercoat layer 65 and may be of any geometry and dimensions, may be placed anywhere between the read structure 70 and the substrate 63, and may be made of any thermally conductive materials. Using highly thermally conductive materials for the pedestal 66 and placing the pedestal 66 closer to the read structure 70 may allow for more effectively enhancing heat conduction by the pedestal 66 and for providing an efficient heat conduction path from the read structure 70 to the substrate 63.

A simulation was performed for a slider having a thick undercoat layer of 20.3 µm and having a thermally conductive pedestal in the thick undercoat layer. The simulation was performed to measure pole tip protrusion and reader temperature increase due to a write current passed through write coils in the slider. It should be understood that the values employed for the simulation are not intended to limit embodiments of the present invention. The simulation was performed with a write current of 80 mA DC, and was performed for a steady state, flying on media, condition of the slider.

It is instructive to compare the simulation results for the thick undercoat layer with the thermally conductive pedestal with the simulation results for the thick undercoat layer without the pedestal. With the thick undercoat layer with the pedestal, the change in temperature of a read element ($\Delta T_R$) due to the write current in the write coils was 5.83° C., while the $\Delta T_R$ was 14.87° C. with the thick undercoat layer without the pedestal. Thus, the $\Delta T_R$ was reduced by 9.04° C. with the thick undercoat layer with the pedestal as compared with the thick undercoat layer without the pedestal. With the thick undercoat layer with the pedestal, the $PTP_R$ was 5.26 nm, while the $PTP_R$ was 8.95 nm with the thick undercoat layer without the pedestal. Also, with the thick undercoat layer with the pedestal, a protrusion at a slider leading edge was 1.73 nm, while the protrusion at the slider leading edge was 1.40 nm with the thick undercoat layer without the pedestal. As a consequence, read gap WPTP was 3.53 nm (=5.26 nm−1.73 nm) for the thick undercoat layer with the pedestal, and read gap WPTP was 7.55 nm (=8.95 nm−1.40 nm) for the thick undercoat layer without the pedestal. Therefore, read gap WPTP was reduced by 4.02 nm with the thick undercoat layer with the pedestal as compared with the thick undercoat layer without the pedestal.

As is demonstrated by the simulation results, including a thermally conductive pedestal in a thermally insulative thick undercoat layer allows for compensating for a negative impact of an extra thickness of the undercoat layer on WPTP and read element temperature increase. The thermally conductive pedestal allows for reducing WPTP and read element temperature increase during write operations. In addition, a pedestal may be further beneficial in reducing external stray field sensitivity of a slider as will now be further explained.

Traditional read shields are designed to have good domain structures, so as to reduce an amount of domain noise produced by the read shields that could affect a read element. As a consequence, a thickness of traditional read shields has been set so as to attempt to ensure good domain structures for the read shields. The designing of traditional read shields with thicknesses to ensure good domain structures has caused read shields to be manufactured with much greater heights than thicknesses.

The geometries of traditional read shields cause external stray magnetic fields that are captured by the read shields to be focused and greatly magnified at an air bearing surface of the read shields. The focusing and magnifying of captured external stray magnetic fields may lead to problems such as: (i) erasing portions of a recording medium; (ii) adversely affecting a reading of data by a read element; (iii) inducing domain noise in a SUL of a recording medium; and (iv) adversely affecting a writing of data by a write structure. Each of the problems caused by the focusing and magnifying of external stray magnetic fields captured by traditionally sized read shields will now be discussed in further detail.

Erasure of data on a recording medium may result from a focusing and magnifying of captured external stray magnetic fields by traditionally sized read shields. Each recording medium has an associated nucleation value defined by a hysteresis loop, where the nucleation value represents a value of a magnetic field that is able to cause a grain in the recording medium to flip magnetization direction irreversibly when applied to the recording medium. For example, for various types of recording media, an applied magnetic field with strength around 2000 Oe may be sufficient to cause grains in the recording media to flip magnetization direction irreversibly and, thus, lead to erasure of the recording media. It should be appreciated that different types of recording media have different nucleation values.

In traditional perpendicular disk drives, it has been observed that an external stray magnetic field with strength of approximately 50 Oe or more is enough to cause irreversible disk drive failure due to erasure of servo data from a recording medium in the disk drive. In an analysis that has been performed, traditionally sized read shields were found to provide large magnetic fields in the presence of an external stray magnetic field that can explain the erasure of a recording medium even for relatively small external stray magnetic fields. For example, with some read shields having traditional geometries, an external stray magnetic field with a strength of approximately 50 Oe may be captured, focused, and magnified by the traditional read shields to provide a magnetic field at portions of a recording medium under the read shields with a strength of approximately 2000 Oe. Thus, the focusing and magnifying of external stray magnetic fields by traditionally sized read shields can account for an erasure of a recording media even for a relatively small external stray magnetic field.

A reading of data from a recording medium by a read element may also be adversely affected by a focusing and magnifying of captured external stray magnetic fields by traditionally sized read shields. In traditional perpendicular disk drives, it has been observed that there is a loss of performance during read operations when the disk drives are subjected to external stray magnetic fields. Such loss of performance has been noticed even for relatively small external stray magnetic fields. For instance, there may be, for example, one order of BER loss for a 10 Oe external stray magnetic field.

In an analysis that has been performed, it was determined that traditionally sized read shields focus and magnify captured external stray magnetic fields at a level of a read element, which may lead to a change in asymmetry of the read element. In various read elements, a range over which a sensing by the read element is linear is finite, and if the read element is biased to be outside of the region of linearity, then there is a resulting BER loss. Additional perpendicular magnetic fields provided by traditionally sized read shields due to a focusing and magnifying of captured external stray magnetic fields may cause a read element to operate outside of a region of linearity and, thus, lead to a loss of performance by the read element. Moreover, longitudinal magnetic fields caused by the traditionally sized read shields due to a focusing and magnifying of captured external stray magnetic fields may change a gain and stability of a read element and may also demagnetize permanent magnets located adjacent to the read element.

Domain noise in a SUL of a recording medium may be induced by a focusing and magnifying of captured external stray magnetic fields by traditionally sized read shields. SUL magnetization may typically be pointed from an inner radius of a recording medium to an outer radius of the recording medium and visa versa. When a magnetization of a SUL is not uniform across a recording medium, there may be a generation of magnetic fields at interfaces of portions of the SUL with reversed magnetizations. In an analysis that has been performed, it was determined that magnetic fields provided by traditionally sized read shields due to a focusing and magnifying of captured external stray magnetic fields can reverse a magnetization of small pieces of a SUL of a corresponding recording medium from their original orientation and, thus, induce SUL domain noise.

A writing of data to a recording medium by a write element may also be adversely affected by a focusing and magnifying of captured external stray magnetic fields by traditionally sized read shields. Because read elements and write elements may be located close together in various heads, some magnetic fields may leak from a read shield to a write structure. Such magnetic fields may cause problems such as: (i) pole lockup; and (ii) write asymmetry. Pole lockup may be caused when a write pole remains in a magnetized state even when no current is applied to coils for the corresponding write structure. A magnetic field that is leaked to a write structure from a read shield may keep the write pole in a magnetized state and cause the write pole to write data at an inappropriate time. Write asymmetry may result in writing data at a wrong location if a stray magnetic field leaked from a read shield biases a magnetic field in a write structure. Such writing at wrong locations lowers a reliability of a corresponding disk drive.

With reference to FIG. 10, a direction of a perpendicular stray magnetic field is shown by an arrow as being perpendicular to the top surface 53 of the recording layer 52 of the recording medium 50. In various embodiments, the pedestal 66 comprises a magnetic material having an orientation selected to capture stray magnetic fields. In some embodiments, the pedestal 66 comprises a ferromagnetic material, or the like. Also, in some embodiments, the pedestal comprises a NiFe invar like alloy where a Ni composition of the alloy is between 30 and 45 atomic percent. In various embodiments, the bottom read shield 76 comprises a first magnetic material, the pedestal 66 comprises a second magnetic material that is a different type of material than the first magnetic material, and the second magnetic material has a lower coefficient of thermal expansion than the first magnetic material.

By forming the pedestal 66 with a magnetic material having an orientation selected to capture perpendicular stray magnetic fields, the pedestal 66 is able to capture some of the external stray magnetic fields that enter the head/media structure 350 from external sources. The external stray magnetic fields captured by the pedestal 66 may be spread out by the mass and surface area of the pedestal 66 so as to reduce a capturing, focusing, and magnifying of external stray magnetic fields by the bottom read shield 76 and the top read shield 74. As a consequence, strengths of magnetic fields generated in the bottom read shield 76 and the top read shield 74 due to external stray magnetic fields of given strengths may be reduced with the addition of the pedestal 66. Reducing the strengths of magnetic fields generated in the bottom read shield 76 and the top read shield 74 due to external stray magnetic fields helps to reduce unwanted erasure of the recording medium 50 and helps to reduce a creation of an asymmetry in the read element 71.

Figure 11:
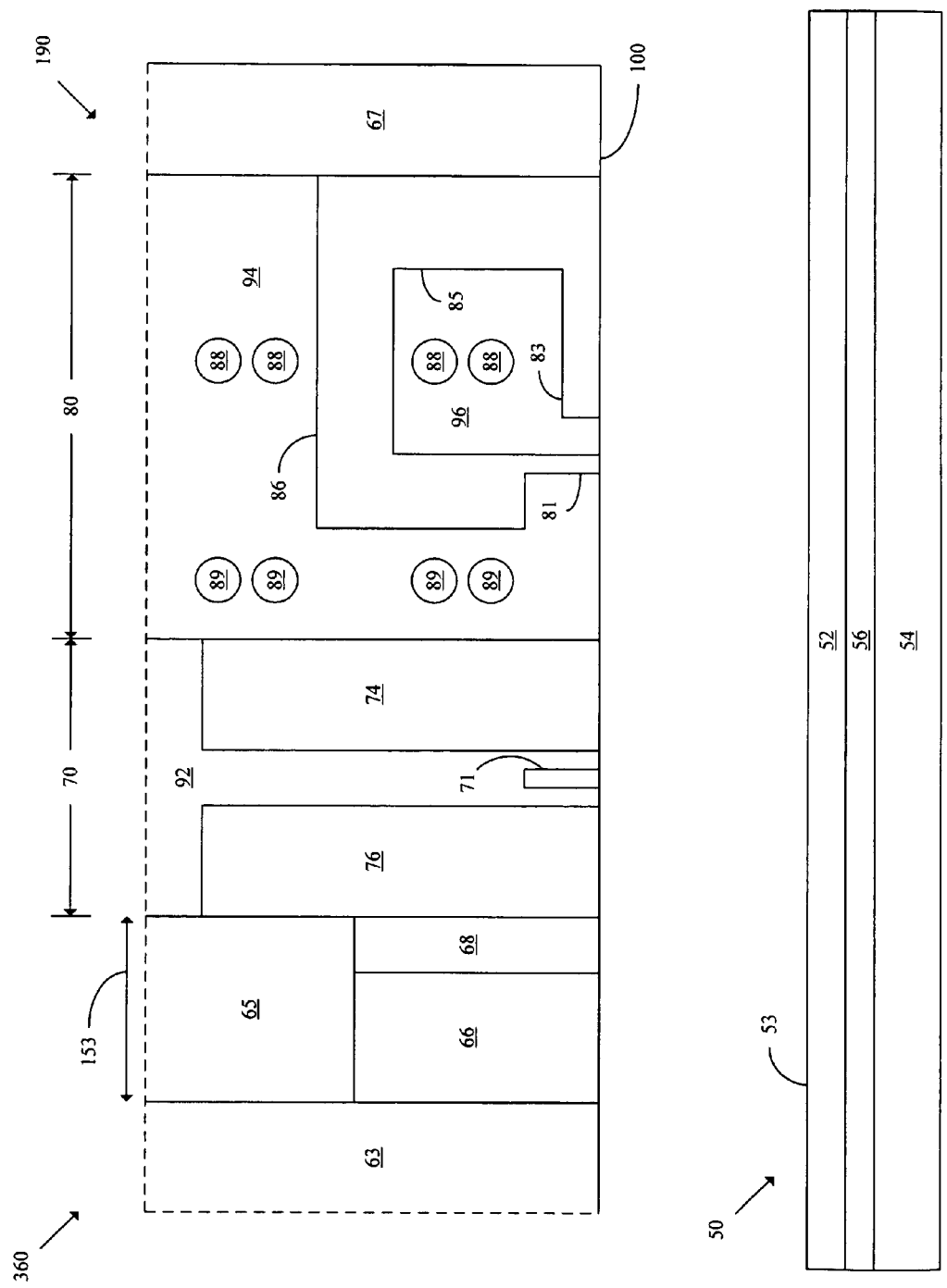
FIG. 11 illustrates a side view of a head/media structure in accordance with an embodiment of the present invention with a pedestal and an exchange decoupling layer.

FIG. 11 illustrates a head/media structure 360 in accordance with an embodiment of the present invention. Elements that are similar between the head/media structure 360 and the head/media structure 300 (refer to FIG. 4) and the head/media structure 350 (refer to FIG. 10) are labeled with the same numeric labels for simplicity. The head/media structure 360 comprises the recording medium 50 and a head 190. The recording medium 50 comprises the recording layer 52, the SUL 54, and the non-magnetic spacer layer 56. The recording layer 52 has the top surface 53. The head 190 comprises the substrate 63, the undercoat layer 65, the pedestal 66, an exchange decoupling layer 68, the read structure 70, the write structure 80, and the overcoat layer 67. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 190 has the ABS 100.

In various embodiments, the exchange decoupling layer 68 is located at least partially between the pedestal 66 and the bottom read shield 76. The exchange decoupling layer 68 is useful when the pedestal 66 comprises a magnetic material. The exchange decoupling layer 68 allows for providing exchange decoupling of the pedestal 66 and the bottom read shield 76. The exchange decoupling layer 68 at least partially provides exchange decoupling of the pedestal 66 and the bottom read shield 76, so as to decouple a domain structure of the pedestal 66 from a domain structure of the bottom read shield 76. In various embodiments, the bottom read shield 76 may have a thickness that is optimized for domain stability, and the exchange decoupling layer 68 provides exchange decoupling of the pedestal 66 and the bottom read shield 76 so as to reduce or minimize an effect of domains in the pedestal 66 on domains in the bottom read shield 76. Thus, in various embodiments, the exchange decoupling layer 68 allows for keeping a good domain structure in the bottom read shield 76 by decoupling a domain of the bottom read shield 76 from a domain of the pedestal 66.

The exchange decoupling layer 68 may comprise any suitable material for providing exchange decoupling of the pedestal 66 and the bottom read shield 76. In various embodiments, the exchange decoupling layer 68 comprises a non-magnetic material. One important issue to consider when selecting a material for the exchange decoupling layer 68 is the issue of magnetostriction, which is that a magnetization of the bottom read shield 76 may be changed by applying a stress to the bottom read shield 76. In order to reduce a change in a magnetization of the bottom read shield 76 due to the exchange decoupling layer 68 and, thus, to have a low magnetostriction effect in the bottom read shield 76, a material may be selected for the exchange decoupling layer 68 that is designed to reduce or limit or minimize an amount of stress placed on the bottom read shield 76.

In order to reduce an amount of stress placed on the bottom read shield 76, a malleable material may be selected for the exchange decoupling layer 68. In various embodiments, the pedestal 66 comprises a material, the exchange decoupling layer 68 comprises a particular material, and the particular material of the exchange decoupling layer 68 is more malleable than the material of the pedestal 66. In various embodiments, the exchange decoupling layer 68 comprises at least one of copper, chromium, gold, silver, platinum, iridium, tantalum, titanium, tungsten, or the like. Copper may be a good choice for the exchange decoupling layer 68, because copper could provide adequate exchange decoupling of the pedestal 66 and the bottom read shield 76, and copper is relatively malleable so it could limit an amount of stress placed on the bottom read shield 76 and, thus, aid in controlling magnetostriction effects in the bottom read shield 76. In various embodiments, gold may be preferred for the exchange decoupling layer 68 in order to minimize susceptibility to corrosion. Alternatively, if the magnetostriction of the bottom read shield 76 is low enough to prevent domain structure problems due to high stress, then a mechanically strong material such as titanium, chrome, or the like may be preferred for the exchange decoupling layer 68. This would help minimize protrusion of the head 190 at elevated temperatures during writing operations.

In various embodiments, a material that is a good thermal conductor may be selected for the exchange decoupling layer 68 in order to take heat out of the bottom read shield 76 and, thus, to help limit an amount of pole tip protrusion of the read structure 70. Copper may also be a good choice for the exchange decoupling layer 68 to take heat out of the bottom read shield 76 and to provide a thermal path from the bottom read shield 76 to the pedestal 66. The exchange decoupling layer 68 may have any suitable thickness for providing adequate exchange decoupling between the pedestal 66 and the bottom read shield 76. In some embodiments, the exchange decoupling layer 68 has a thickness that is thick enough such that a domain structure of the bottom read shield 76 is unaffected by the pedestal 66. Also, in some embodiments, a sum of a thickness of the exchange decoupling layer 68 and a thickness of the pedestal 66 is equal to the thickness 153 of the undercoat layer 65. In various embodiments, the exchange decoupling layer 68 is located at least partially in the undercoat layer 65 of the head 190. In some embodiments, an electrically insulating layer (not shown) comprising, for example, alumina or the like may be located between the exchange decoupling layer 68 and the bottom read shield 76. Also, in some embodiments, an electrically insulating layer (not shown) comprising, for example, alumina or the like may be located between the pedestal 66 and the substrate 63 for at least partially providing electrical insulation between the read structure 70 and the substrate 63.

Figure 12:
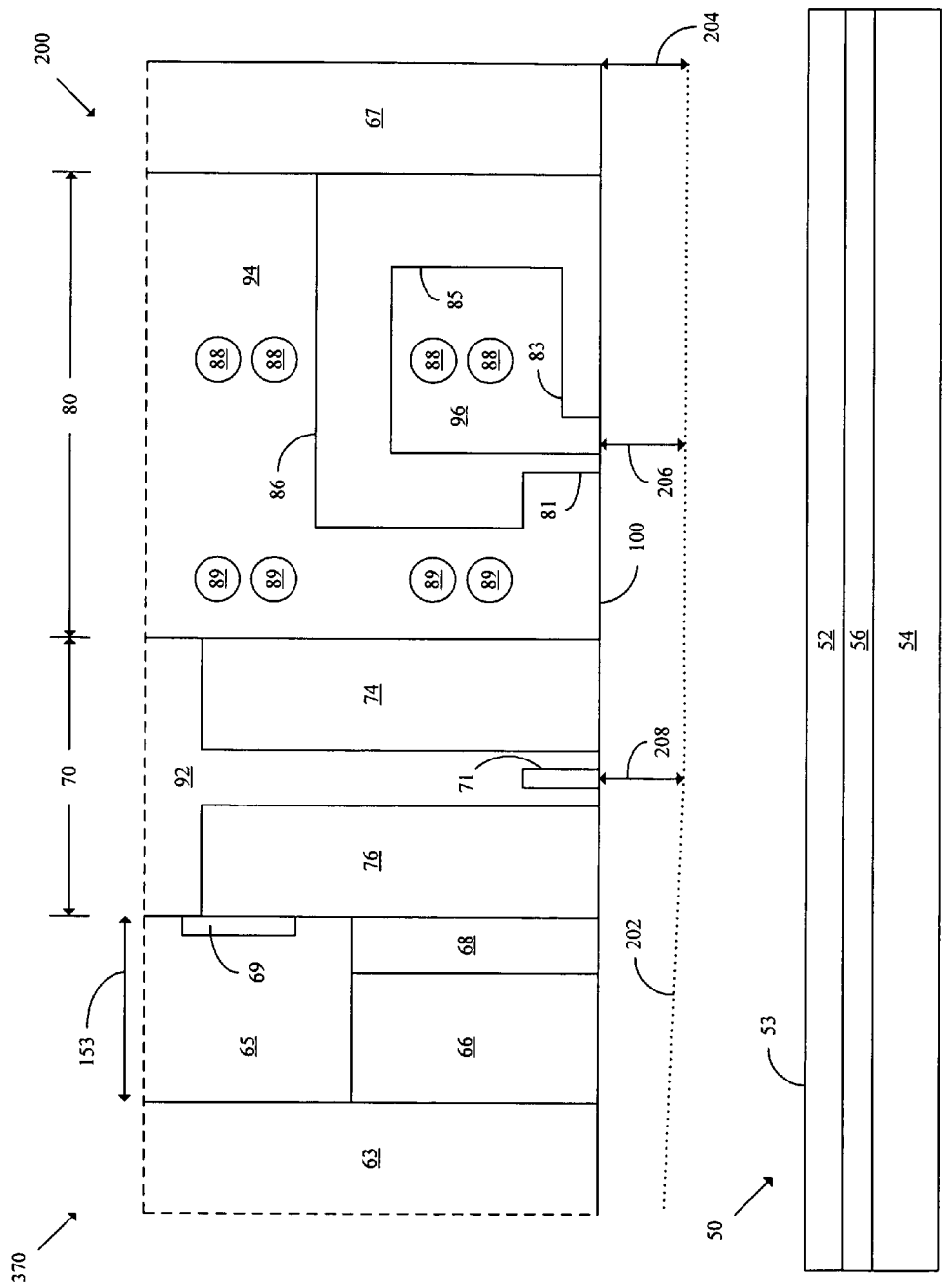
FIG. 12 illustrates a side view of a head/media structure in accordance with an embodiment of the present invention with a heating element at least partially in an undercoat layer and a pedestal and an exchange decoupling layer.

FIG. 12 illustrates a head/media structure 370 in accordance with an embodiment of the present invention. Elements that are similar between the head/media structure 370 and the head/media structure 300 (refer to FIG. 4) and the head/media structure 360 (refer to FIG. 11) are labeled with the same numeric labels for simplicity. The head/media structure 370 comprises the recording medium 50 and a head 200. The recording medium 50 comprises the recording layer 52, the SUL 54, and the non-magnetic spacer layer 56. The recording layer 52 has the top surface 53. The head 200 comprises the substrate 63, the undercoat layer 65, the pedestal 66, the exchange decoupling layer 68, the read structure 70, the write structure 80, the overcoat layer 67, and the heating element 69. The read structure 70 comprises the read element 71, the top read shield 74, the bottom read shield 76, and the read structure insulation portion 92. The write structure 80 comprises the write pole 81, the write shield 83, the write return yoke 85, the write yoke 86, the one or more write coils 88, the one or more bucking coils 89, the first write structure insulation portion 94, and the second write structure insulation portion 96. The head 200 has the ABS 100. The undercoat layer 65 has the thickness 153.

The read structure 70 of the head 200 allows for reading magnetic fields from the recording medium 50. The undercoat layer 65 of the head 200 allows for at least partially providing electrical insulation between the read structure 70 and the substrate 63. The heating element 69 of the head 200 is located at least partially in the undercoat layer 65 and allows for providing heat. The pedestal 66 of the head 200 allows for at least partially providing thermal conduction between the read structure 70 and the substrate 63. The exchange decoupling layer 68 of the head 200 allows for providing exchange decoupling of the pedestal 66 and the bottom read shield 76.

In various embodiments, two or more heating elements (not shown) may be located at least partially in the undercoat layer 65 for providing heat. In some embodiments, the heating element 69 is located at least partially in the undercoat layer 65, and a second heating element (not shown) is located at least partially in the overcoat layer 67 for providing heat. In various embodiments, there may be two or more pedestals (not shown) located in the undercoat layer 65.

When the heating element 69 of the head 200 is actuated to provide heat, the ABS 100 of the head 200 protrudes outward. For example, positions of the ABS 100 of the head 200 may be displaced to positions indicated by the dotted line 202 when the heating element 69 provides heat to the head 200. A trailing edge displacement is indicated by a double-sided arrow 204 between the original ABS 100 at the trailing edge of the head 200 and the displaced ABS 202. A read gap displacement is indicated by a double-sided arrow 208 between the ABS 100 at the read structure 70 and the displaced ABS 202. A write gap displacement is indicated by a double sided arrow 206 between the ABS 100 at the write structure 80 and the displaced ABS 202.

A simulation was performed for a slider having a heater located in a thick undercoat layer and having a thermally conductive pedestal located in the thick undercoat layer. The simulation was performed to simulate a 55Ω heater as a heating element located 50 μm off an ABS of the slider in the undercoat layer and next to a bottom read shield and 20 μm from a substrate of the slider. A simulation thickness of the undercoat layer was greater than 20 μm. A simulation material of the pedestal was $Ni_{36}Fe_{64}$. A simulation power of the heater was $P_H$=100 mW DC. It should be understood that the values employed for the simulation are not intended to limit embodiments of the present invention. The simulation was performed for a steady state, flying on media, condition of the slider.

As a result of the simulation, a read gap displacement was −42.0 nm, a write gap displacement was −45.4 nm, and a trailing edge displacement at a trailing edge of the slider was −47.7 nm. The min FH of the simulation was at the trailing edge of the slider. Thus, the write gap-to-min FH difference in the simulation was −2.3 nm (=−47.7 nm+45.4 nm). The leading edge displacement of the slider in the simulation was −19.8 nm. As a result, the $FHA_R$ of the simulation was −0.87 microinches (=[−42.0 nm+19.8 nm]*[1 microinch/25.4 nm]) per 100 mW. Also, in the simulation, a maximum change in temperature at the heater in the slider ($\Delta T^{max}$) was 110.0° C., and a change in temperature of a read element of the slider ($\Delta T_R$) was 14.9° C.

It is instructive to compare the simulation results for the heater and pedestal in the thick undercoat layer with the simulation results for the heater in the overcoat layer. With the heater and pedestal in the thick undercoat layer, the write gap-to-min FH difference was −2.3 nm, while the write gap-to-min FH difference was −3.5 nm with the heater in the overcoat layer. Thus, the write gap-to-min FH difference was reduced by 34% by placing the heater and pedestal in the thick undercoat layer rather than placing the heater in the overcoat layer. With the heater and pedestal in the thick undercoat layer, the $FHA_R$ was −0.87 microinches per 100 mW, while the $FHA_R$ was −0.72 microinches per 100 mW with the heater in the overcoat layer. Thus, the flying height adjustment efficiency at the read gap was increased by 21% by placing the heater and pedestal in the thick undercoat layer rather placing the heater in the overcoat layer. Therefore, placing the heater and pedestal in the thick undercoat layer may greatly reduce gap-to-min FH difference and may greatly improve flying height adjustment efficiency. Moreover, with the heater and pedestal in the thick undercoat layer, the $\Delta T_R$ was 14.9° C., while the $\Delta T_R$ was 15.4° C. with the heater in the overcoat layer. Thus, the heater and pedestal in the thick undercoat layer may allow for reduced read element temperatures as compared with the heater in the overcoat layer.

Figure 13:
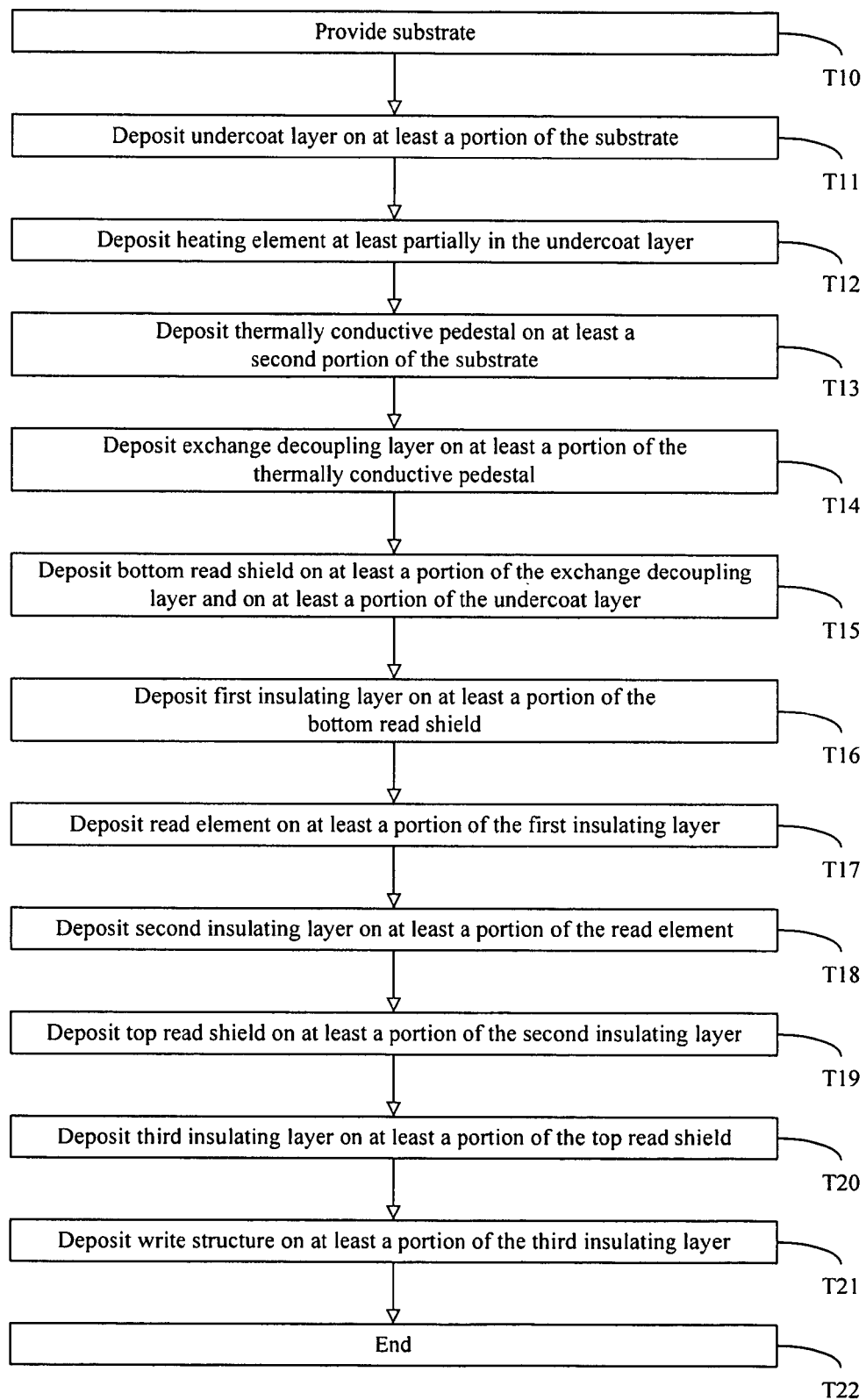
FIG. 13 illustrates a flowchart of a process of manufacturing a head in accordance with an embodiment of the present invention.

FIG. 13 illustrates a flowchart of a process of manufacturing a head, such as the head 200 (refer to FIG. 12), in accordance with an embodiment of the present invention. In describing the process of FIG. 13, reference will be made to elements of the head 200 in FIG. 12. In T10, a substrate is provided, such as the substrate 63, and the process continues to T11. In T11, an undercoat layer, such as the undercoat layer 65, is deposited on at least a portion of the substrate, and the process continues to T12. In T12, a heating element, such as the heating element 69, is deposited at least partially in the undercoat layer, and the process continues to T13.

In T13, a thermally conductive pedestal, such as the pedestal 66, is deposited on at least a second portion of the substrate, and the process continues to T14. In T14, an exchange decoupling layer, such as the exchange decoupling layer 68 is deposited on at least a portion of the thermally conductive pedestal, and the process continues to T15. In T15, a bottom read shield, such as the bottom read shield 76, is deposited on at least a portion of the exchange decoupling layer and on at least a portion of the undercoat layer, and the process continues to T16. In T16, a first insulating layer, such as a portion of the read structure insulation portion 92, is deposited on at least a portion of the bottom read shield, and the process continues to T17.

In T17, a read element, such as the read element 71, is deposited on at least a portion of the first insulating layer, and the process continues to T18. In T18, a second insulating layer, such as a second portion of the read structure insulation portion 92, is deposited on at least a portion of the read element, and the process continues to T19. In T19, a top read shield, such as the top read shield 74, is deposited on at least a portion of the second insulating layer, and the process continues to T20. In T20, a third insulating layer, such as a portion of the first write structure insulation portion 94, is deposited on at least a portion of the top read shield, and the process continues to T21. In T21, a write structure, such as the write structure 80, is deposited on at least a portion of the third insulating layer, and then the process ends in T22. In various embodiments, the process further comprises depositing an overcoat layer, such as the overcoat layer 67 on the write structure.

As described above, embodiments of the present invention allow for empowering flying height adjustment technology and for improving recording areal density while limiting adverse consequences related to disk drive reliability. Such flying height adjustment technology has the potential for compensating for WPTP, environmental pole tip protrusion (EPTP), head manufacturing tolerances, altitude sensitivity, undesirable flying height profiles, coupled read and write flying heights, and the like. Embodiments of the present invention reduce gap-to-min FH differences by placing a heating element in an undercoat layer. Also, embodiments of the present invention allow for maintaining or increasing FHA efficiency by putting a thick insulation layer between a heating element and a substrate. Furthermore, embodiments of the present invention are further improved by adding a pedestal in a thick undercoat layer to reduce a negative impact of the thick undercoat layer on WPTP and read element temperature increase and to reduce a sensitivity to external perpendicular stray magnetic fields.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A head, comprising:
a substrate;
a read structure for reading magnetic fields from a recording medium;
an undercoat material for at least partially providing electrical insulation between the read structure and the substrate;
a heating element located at least partially in the undercoat material for providing heat; and
a pedestal for at least partially providing thermal conduction between the read structure and the substrate;
wherein a thickness of the undercoat material is in a range of 0.1-6 μm.

2. The head of claim 1, further comprising:
a write structure for providing particular magnetic fields to the recording medium to write data to the recording medium;
wherein the read structure is located at least partially between a portion of the undercoat material and a portion of the write structure.

3. The head of claim 2, further comprising:
an overcoat layer for at least partially protecting the write structure;
wherein the write structure is located at least partially between a portion of the read structure and a portion of the overcoat layer.

4. The head of claim 1, further comprising:
a second pedestal located at least partially in the undercoat material for at least partially providing thermal conduction between the read structure and the substrate.

5. The head of claim 1,
wherein the pedestal is located at least partially between the heating element and an air bearing surface of the head.

6. The head of claim 1,
wherein at least a portion of the undercoat material is located between a portion of the substrate and a portion of the read structure.

7. The head of claim 1,
wherein the substrate comprises AlTiC; and
wherein the undercoat material comprises $Al_2O_3$.

8. The head of claim 1, wherein:
the heating element is located at least partially between the substrate and the read structure; and
the undercoat material at least partially provides thermal insulation between the heating element and the substrate.

9. The head of claim 1,
wherein the heating element comprises at least one of a heating coil and a film heater.

10. The head of claim 1, wherein:
the heating element is controllable for selectively heating at least a particular portion of the read structure; and
the read structure is formed such that the read structure is capable of expanding at an air bearing surface of the head when at least the particular portion of the read structure is heated by the heating element.

11. The head of claim 1, further comprising:
a write structure for providing particular magnetic fields to the recording medium to write data to the recording medium;
wherein the read structure is located at least partially between the undercoat material and the write structure; and
wherein the heating element allows for heating at least a portion of the write structure.

12. The head of claim 11,
wherein the heating element is controllable for selectively heating at least the portion of the write structure; and
wherein the write structure is formed such that the write structure is capable of expanding at an air bearing surface of the head when at least the portion of the write structure is heated by the heating element.

13. The head of claim 1, further comprising:
a second heating element for providing heat.

14. The head of claim 1, wherein the read structure comprises:
a read element for reading the magnetic fields from the recording medium;
a top read shield for at least partially shielding the read element from stray magnetic fields; and
a bottom read shield for at least partially shielding the read element from the stray magnetic fields.

15. The head of claim 14,
wherein the bottom read shield comprises a first magnetic material;
wherein the pedestal comprises a second magnetic material that is a different type of material than the first magnetic material; and
wherein the second magnetic material has a lower coefficient of thermal expansion than the first magnetic material.

16. The head of claim 14,
wherein the bottom read shield comprises a first magnetic material;
wherein the pedestal comprises a second magnetic material that is a different type of material than the first magnetic material; and
wherein the second magnetic material has a lower coefficient of thermal expansion than the first magnetic material.

17. The head of claim 14,
wherein the read element is located at least partially between the top read shield and the bottom read shield; and
wherein the bottom read shield is located at least partially between the undercoat material and the top read shield.

18. The head of claim 17,
wherein a first portion of the pedestal is in contact with the substrate; and
wherein a second portion of the pedestal is in contact with the bottom read shield.

19. The head of claim 17,
wherein the pedestal comprises a magnetic material having an orientation selected to capture at least a portion of the stray magnetic fields.

20. The head of claim 19, further comprising:
an exchange decoupling layer located at least partially between the pedestal and the bottom read shield for providing exchange decoupling of the pedestal and the bottom read shield.

21. The head of claim 20,
wherein the exchange decoupling layer comprises at least one of copper, chromium, gold, silver, platinum, iridium, tantalum, titanium, and tungsten.

22. The head of claim 1,
wherein the pedestal is located at least partially between the read structure and the substrate.

23. The head of claim 1,
wherein the pedestal is located at least partially in the undercoat material.

24. The head of claim 1,
wherein the pedestal comprises at least one of invar and a NiFe invar like alloy where a Ni composition of the alloy is between 30 and 45 atomic percent.

25. A head, comprising:
a substrate;
a read structure for reading magnetic fields from a recording medium comprising:
  a read element for reading the magnetic fields from the recording medium;
  a top read shield for at least partially shielding the read element from stray magnetic fields; and
  a bottom read shield for at least partially shielding the read element from the stray magnetic fields;
  wherein the read element is located at least partially between the top read shield and the bottom read shield;
an undercoat material for at least partially providing electrical insulation between the read structure and the substrate, wherein the bottom read shield is located at least partially between the undercoat material and the top read shield;
a heating element located at least partially in the undercoat material for providing heat; and
a pedestal for at least partially providing thermal conduction between the read structure and the substrate, wherein the pedestal comprises a first portion in contact with the substrate and a second portion in contact with the bottom read shield.

26. The head of claim 25, wherein the pedestal comprises a magnetic material having an orientation selected to capture at least a portion of the stray magnetic fields.

27. The head of claim 26, further comprising:
an exchange decoupling layer located at least partially between the pedestal and the bottom read shield for providing exchange decoupling of the pedestal and the bottom read shield.

28. The head of claim 27, wherein the exchange decoupling layer comprises at least one of copper, chromium, gold, silver, platinum, iridium, tantalum, titanium, and tungsten.

29. The head of claim 25, wherein a thickness of the undercoat material in a direction from the substrate to the read structure is greater than 10 μm.

30. A head, comprising:
a substrate;
a read structure for reading magnetic fields from a recording medium comprising:
  a read element for reading the magnetic fields from the recording medium;
  a top read shield for at least partially shielding the read element from stray magnetic fields; and
  a bottom read shield comprising a first magnetic material for at least partially shielding the read element from the stray magnetic fields;
an undercoat material for at least partially providing electrical insulation between the read structure and the substrate;
a heating element located at least partially in the undercoat material for providing heat; and
a pedestal for at least partially providing thermal conduction between the read structure and the substrate, wherein the pedestal comprises a second magnetic material having a lower coefficient of thermal expansion than the first magnetic material.

31. The head of claim 30, wherein the pedestal comprises a first portion in contact with the substrate and a second portion in contact with the bottom read shield.

32. The head of claim 30, wherein a thickness of the undercoat material in a direction from the substrate to the read structure is greater than 10 μm.

* * * * *

UNITED STATES PATENT AND TRADEMARK OFFICE
CERTIFICATE OF CORRECTION

| | | |
|---|---|---|
| PATENT NO. | : 7,656,619 B1 | Page 1 of 1 |
| APPLICATION NO. | : 11/418512 | |
| DATED | : February 2, 2010 | |
| INVENTOR(S) | : Wentao Yan et al. | |

It is certified that error appears in the above-identified patent and that said Letters Patent is hereby corrected as shown below:

On the Title Page:

The first and sole Notice should read --

Subject to any disclaimer, the term of this patent is extended or adjusted under 35 U.S.C. 154(b) by 676 days.

Column 32
Line 38, delete "14" and insert --25--.

Signed and Sealed this

Twenty-first Day of September, 2010

David J. Kappos
*Director of the United States Patent and Trademark Office*